US011976802B2

(12) United States Patent
LaVigna et al.

(10) Patent No.: US 11,976,802 B2
(45) Date of Patent: May 7, 2024

(54) MODULAR LED LIGHT STRUCTURE

(71) Applicant: HKC-US, LLC, Memphis, TN (US)

(72) Inventors: David LaVigna, Mullica Hill, NJ (US); Matt Willard, Olive Branch, MS (US); Tim Norton, Kennesaw, GA (US)

(73) Assignee: HKC-US, LLC, Memphis, TN (US)

( * ) Notice: Subject to any disclaimer, the term of this patent is extended or adjusted under 35 U.S.C. 154(b) by 0 days.

(21) Appl. No.: 17/948,992

(22) Filed: Sep. 20, 2022

(65) Prior Publication Data

US 2023/0332752 A1 Oct. 19, 2023

Related U.S. Application Data

(60) Provisional application No. 63/333,430, filed on Apr. 21, 2022, provisional application No. 63/330,560, filed on Apr. 13, 2022.

(51) Int. Cl.
*F21S 8/00* (2006.01)
*F21S 2/00* (2016.01)
(Continued)

(52) U.S. Cl.
CPC ............... *F21S 8/035* (2013.01); *F21S 2/005* (2013.01); *F21V 5/00* (2013.01); *F21V 29/70* (2015.01); *F21Y 2115/10* (2016.08)

(58) Field of Classification Search
CPC ... F21S 8/035; F21S 2/005; F21S 8/03; F21V 5/00; F21V 29/70; F21V 21/03; F21V 17/14; F21V 17/16; F21V 17/164; F21V 17/10; F21V 23/009; F21V 17/002; F21Y 2115/10; F21Y 2103/33
See application file for complete search history.

(56) References Cited

U.S. PATENT DOCUMENTS 5,688,035 A 11/1997 Kashima et al.
7,631,993 B2 * 12/2009 Russello ................ F21V 15/04 362/362
(Continued)

FOREIGN PATENT DOCUMENTS

CN 212565657 U * 2/2021
CN 113775946 A * 12/2021
(Continued)

OTHER PUBLICATIONS

English Translation of CN-113775946A, RGB Point Control E27 Bulb Lamp, 2021.*

*Primary Examiner* — Zheng Song
*Assistant Examiner* — Glenn D. Zimmerman
(74) *Attorney, Agent, or Firm* — Butler Snow LLP; Jon E. Holland

(57) ABSTRACT

A modular luminaire assembly comprising includes a mounting ring configured to be selectively coupled with a mounting surface, an inner housing defining a channel configured to receive the mounting ring, wherein the mounting ring is configured to be selectively coupled with the inner housing, a lighting assembly, one or more diffusers configured to direct light from the lighting assembly; and a retaining ring including a ring body defining an opening a plurality of flanges configured to snap engage with the inner housing, wherein the ring body is configured to at least partially support the one or more diffusers and the lighting assembly.

20 Claims, 31 Drawing Sheets

(51) Int. Cl.

| | |
|---|---|
| ***F21V 5/00*** | (2018.01) |
| ***F21V 29/70*** | (2015.01) |
| ***F21Y 115/10*** | (2016.01) |

(56) References Cited

U.S. PATENT DOCUMENTS

| | | | | |
|---|---|---|---|---|
| 7,905,626 | B2 | 3/2011 | Shantha et al. | |
| 9,772,440 | B2 | 9/2017 | McCollum et al. | |
| 9,778,410 | B2 | 10/2017 | Parker et al. | |
| 9,946,007 | B2 | 4/2018 | Sahlhoff et al. | |
| 10,041,638 | B2 | 8/2018 | Vasquez et al. | |
| 10,072,806 | B1 * | 9/2018 | Yarnell | F21S 8/06 |
| 10,119,684 | B2 | 11/2018 | O'Brien et al. | |
| 10,545,279 | B2 | 1/2020 | York et al. | |
| 10,655,838 | B1 * | 5/2020 | Aikala | F21V 3/061 |
| 10,670,250 | B2 | 6/2020 | Bonne | |
| 10,859,243 | B2 | 12/2020 | Simmons, Jr. et al. | |
| 11,085,598 | B2 | 8/2021 | Ward | |
| 11,137,120 | B2 | 10/2021 | Creasman et al. | |
| 11,149,935 | B2 | 10/2021 | Huang et al. | |
| 11,181,680 | B1 | 11/2021 | Sorensen et al. | |
| 11,274,821 | B2 * | 3/2022 | Danesh | F21V 17/16 |
| 2002/0021384 | A1 | 2/2002 | Taniguchi et al. | |
| 2007/0127911 | A1 * | 6/2007 | Frick | G08B 13/19636 396/419 |
| 2007/0274097 | A1 | 11/2007 | Chen et al. | |
| 2010/0328925 | A1 * | 12/2010 | Hoelen | F21V 13/14 362/84 |
| 2013/0286669 | A1 * | 10/2013 | Moser | F21V 19/001 362/382 |
| 2019/0316763 | A1 * | 10/2019 | Farmer | F21V 29/70 |
| 2019/0323691 | A1 * | 10/2019 | Winters | F21V 23/006 |
| 2020/0080709 | A1 * | 3/2020 | Boulanger | F21V 21/04 |
| 2021/0388844 | A1 | 12/2021 | Rhoades et al. | |
| 2022/0026620 | A1 | 1/2022 | Creasman et al. | |

FOREIGN PATENT DOCUMENTS

| | | | | |
|---|---|---|---|---|
| EP | 3141810 | A1 * | 3/2017 | F21L 4/08 |
| EP | 3974705 | A1 * | 3/2022 | F21S 8/02 |
| WO | WO-2020181249 | A1 * | 9/2020 | F21S 8/00 |

* cited by examiner

MODULAR LED LIGHT STRUCTURE

CROSS-REFERENCE TO RELATED APPLICATIONS

This application claims priority to U.S. Provisional Application No. 63/330,560 to David LaVigna et al. filed on Apr. 13, 2022 and U.S. Provisional Application No. 63/333,430 to David LaVigna et al. filed on Apr. 21, 2022, the contents of which are incorporated herein by reference in their entirety.

FIELD OF THE INVENTION

This invention relates to LED luminaires and, more particularly, to a luminaire having a plurality of light engines, diffusers, and décor trims assembled to a common structure.

BACKGROUND OF THE INVENTION

LED (light emitting diode) luminaires are used in lighting commercial, institutional, and residential buildings. Many are designed utilizing configurations with foundations in legacy lighting such as fluorescent and incandescent. Features of luminaires are typically fixed, non-changing, as an outcome of design and production methods and could encompass color correlated temperature (CCT) differences, external décor appearances, changes in light pattern diffusion, LED light engine assemblies (combination of system power supply and LED PCBA configurations), and lighting controls.

Current industry practice is to adapt the LED system components to a legacy or contemporary form factors, with little or no modifications available to the basic structural components of the luminaire. Further, certain aspects such as light emission direction are fixed and unalterable in any post production capacity. These limitations restrict or prohibit advantages of interchangeable components, thus increasing costs in production, assembly, and warehousing.

SUMMARY

In a first aspect, a modular luminaire assembly for use in connection with an electrical power source, and a driver operatively electrically connected to the power source. The luminaire structure comprises a universal mounting ring affixed to a recessed electrical splice compartment and mechanically connected to the electrical power source. The luminaire further comprises an inner body to which light engine, structural components, and attachment to mounting ring are facilitated. The inner body is comprised of non-conductive material.

In a second aspect, a modular luminaire assembly for use in connection with an electrical power source, and a driver operatively electrically connected to the power source. The luminaire inner body comprises locations to affix the driver assembly, index a thermal plate for the driver and a thermal pan, radial planes the index a first and a second curved LED printed circuit board assembly (PCBA), index points by which an upward directing lens is snapped in place by mechanical means, index points by which a décor bezel assembly is affixed. These said indexing points are axially distributed in a common plane of a respective component, and placed equidistant radially from each other in arrays of 2, 3, 4 or more locations.

In a third aspect, a modular luminaire assembly for use in connection with an electrical power source, and a driver operatively electrically connected to the power source. The luminaire utilizes an internal retaining ring which acts to set the depth of the light mixing chamber, and set location for the diffusers, reflectors, light guide plate, and décor diffuser in variations of the total feature and appearance by which the product may be configured in final form.

In a fourth aspect, a modular luminaire assembly for use in connection with an electrical power source, and a driver operatively electrically connected to the power source. The luminaire inner body may be utilized using one LED PCBA. Further variations may comprise two LED PCBA. These LED PCBA using a plurality of LED, may comprise a flexible substrate suitable for curving the PCBA along an axis 90 degree from the LED mounting plane, or mounting said plurality of LED in a common plane with the PCBA plane. The aspect continues in that it is not limited to using a single PCBA variation as described herein, but may comprise diverse pairings.

In a fifth aspect, a modular luminaire assembly for use in connection with an electrical power source, and a driver operatively electrically connected to the power source. A driver is mounted to a thermal plate, and located along a central axis to the luminaire and upon the inner body. The driver is not limited to configuration type (one type being an open chassis using AC to DC conversion circuits directly mounted to circuit board (AC DOB), another type being a switch mode power supply (SMPS) encased with a body). Said drivers can embody means to dim lighting output, change CCT by means of physical switches or external inputs through various means, connect to sensing devices affixed to the luminaire or driver, and interface with external input/output devices using wireless communications radio sets.

DETAILED DESCRIPTION OF THE INVENTION

Figure 1:
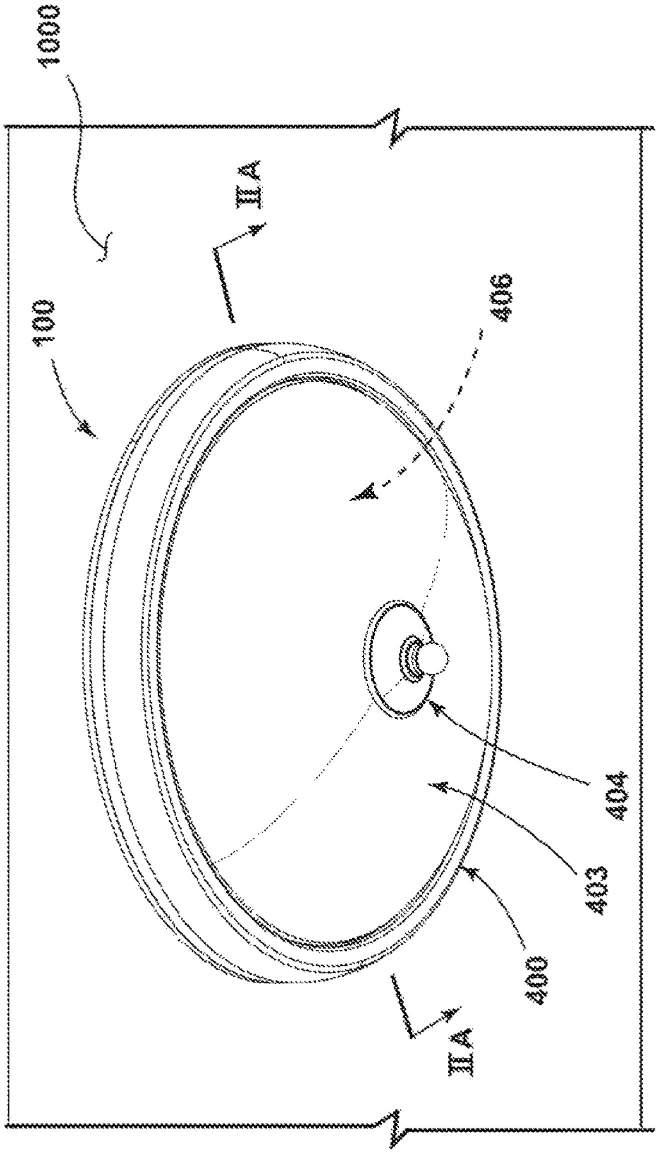
FIG. 1 is a bottom perspective view of a modular luminaire assembly, according to various examples.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components. The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially," is not to be limited to the precise value specified. In at least some instances, the approximating language may correspond to the precision of an instrument for measuring the value, or the precision of the methods or apparatus for constructing or manufacturing the components and/or systems. For example, the approximating language may refer to being within a ten percent margin.

Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

The present disclosure is generally related to a modular luminaire assembly 100. The modular luminaire assembly 100 disclosed herein is configured to allow a user to alter the appearance and performance of the luminaire assembly 100, specifically to change to visible décor elements. It would be further useful for said structure to facilitate changes to what were previously fixed performance characteristics. It is advantageous to lower costs of production, assembly costs, and sustainability to accommodate changes in diffusion, CCT (color correlated temperature), addition of upward directed light sources, light engine types, and controls.

Figure 2:
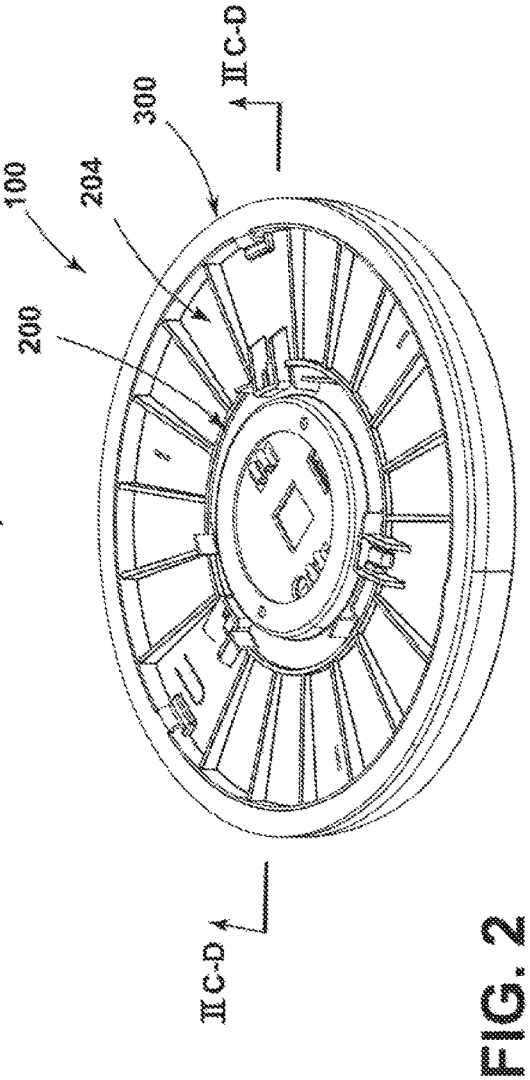
FIG. 2 is a top perspective view of a modular luminaire assembly, according to various examples.
Figure 2A:
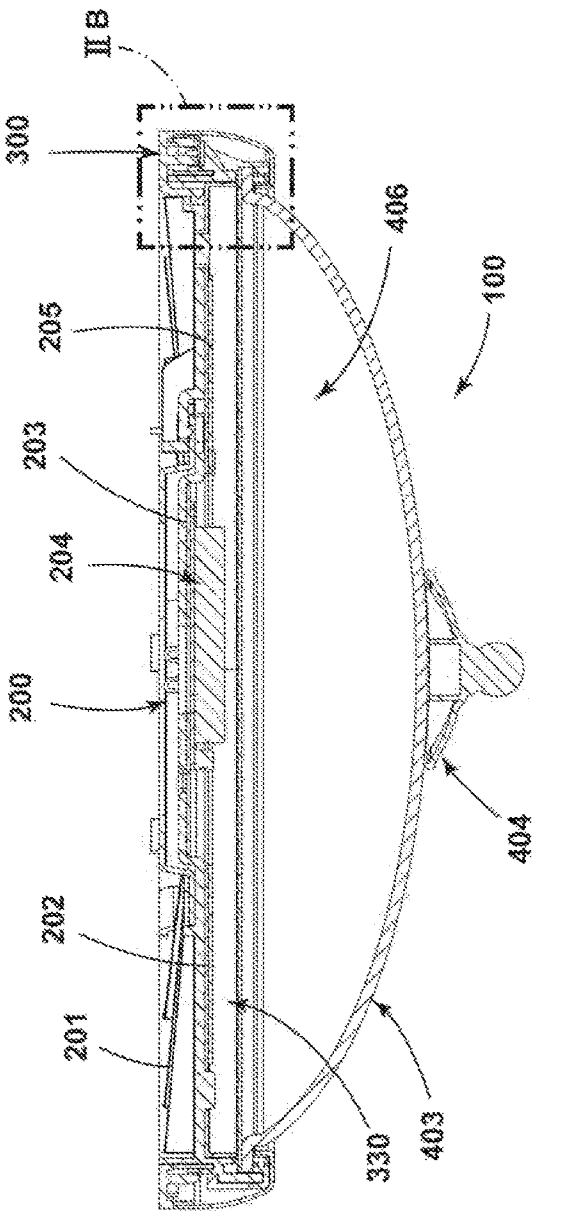
FIG. 2A is a cross-sectional view of the modular luminaire assembly of FIG. 1 taken along line IIA-IIA.
Figure 2B:
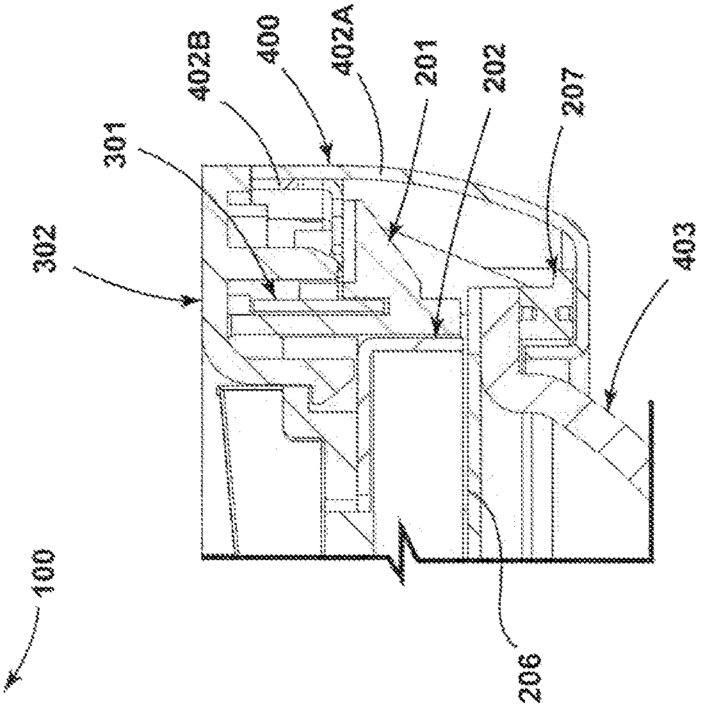
FIG. 2B is an enlarged partial view of section IIB of FIG. 2A
Figure 2C:
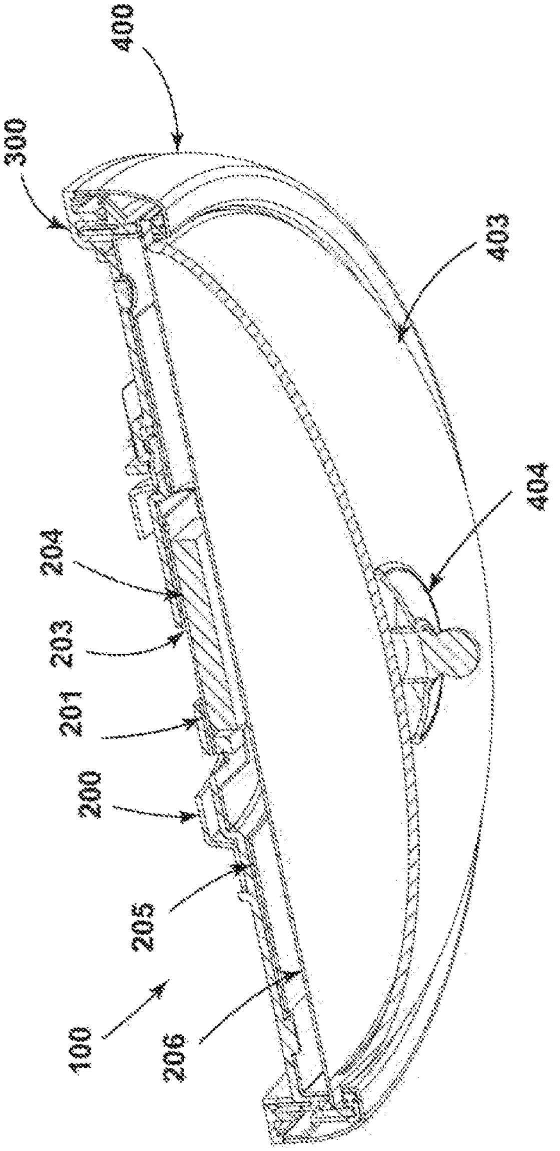
FIG. 2C is a first perspective cross-sectional view of the modular luminaire assembly of FIG. 2 taken along line IIC-D-IIC-D.
Figure 2D:
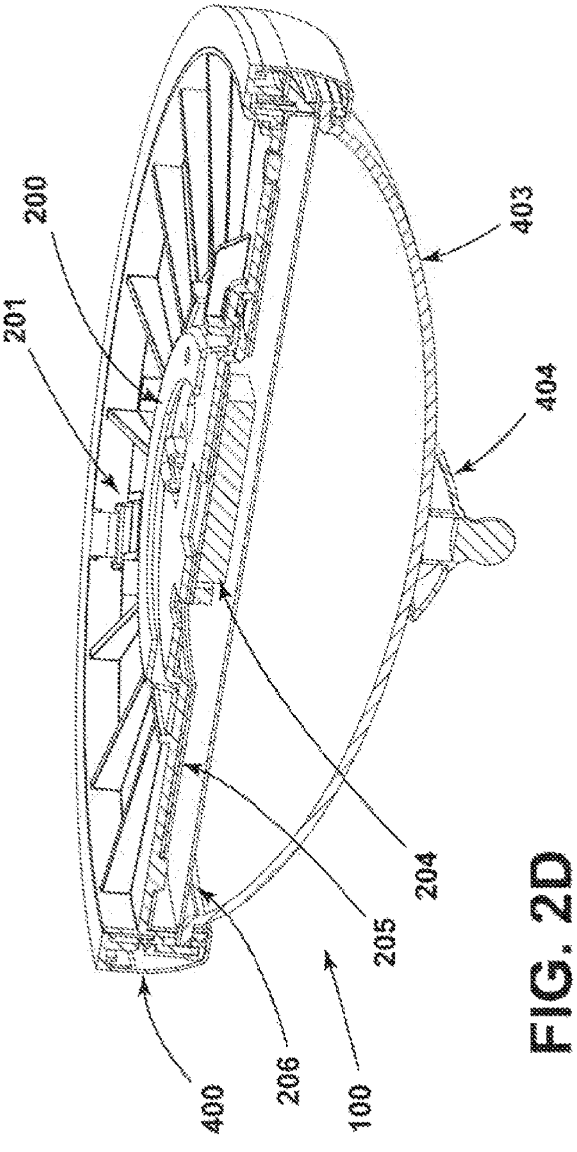
FIG. 2D is a second perspective cross-sectional view of the modular luminaire assembly of FIG. 2 taken along line IIC-D-IIC-D.
Figure 3:
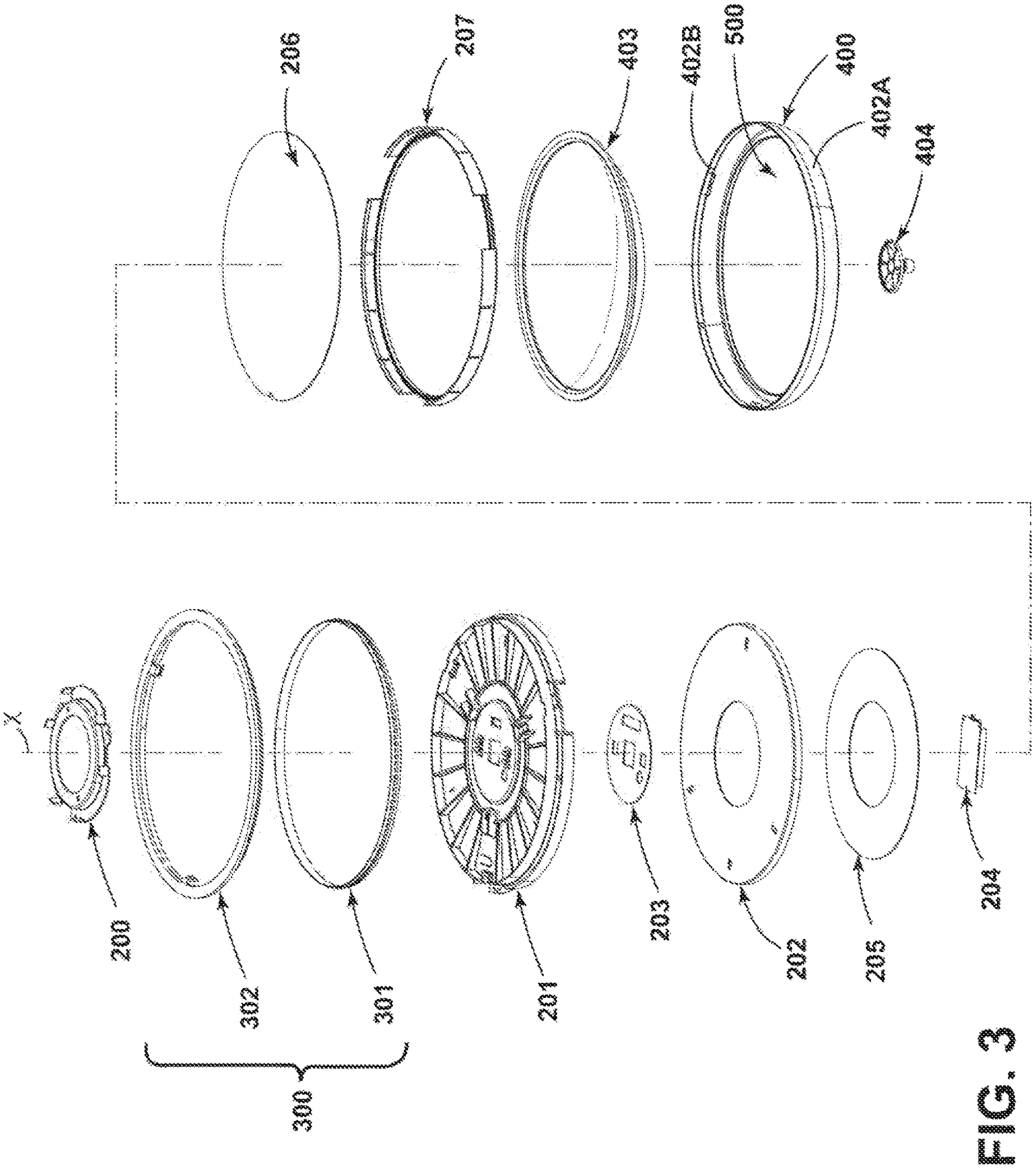
FIG. 3 is an exploded view of the modular luminaire assembly of FIG. 1.

Referring now to FIGS. 1-3, a modular luminaire assembly 100 is shown for use in connection with an electrical power source and external control means (not shown). The modular luminaire assembly 100 comprises a mounting ring 200 coupled with an inner housing 201 and configured to selective couple the luminaire assembly 100 with a mounting surface 1000. A bezel assembly 400 may be coupled with the inner housing 201 and defines an opening 500 configured at least partially receive an outer housing 403. The outer housing 403, the inner housing 201, and the bezel assembly 400 are coupled to define a cavity 406. The cavity 406 may be configured to house one or more light assemblies 205, 208, a thermal pan 202, a thermal plate 203, a power converter assembly 204, a light guide 210, a reflector 209, and/or an interior diffuser 206. In various examples, the luminaire assembly 100 may further include a nightlight assembly 300.

Figure 4:
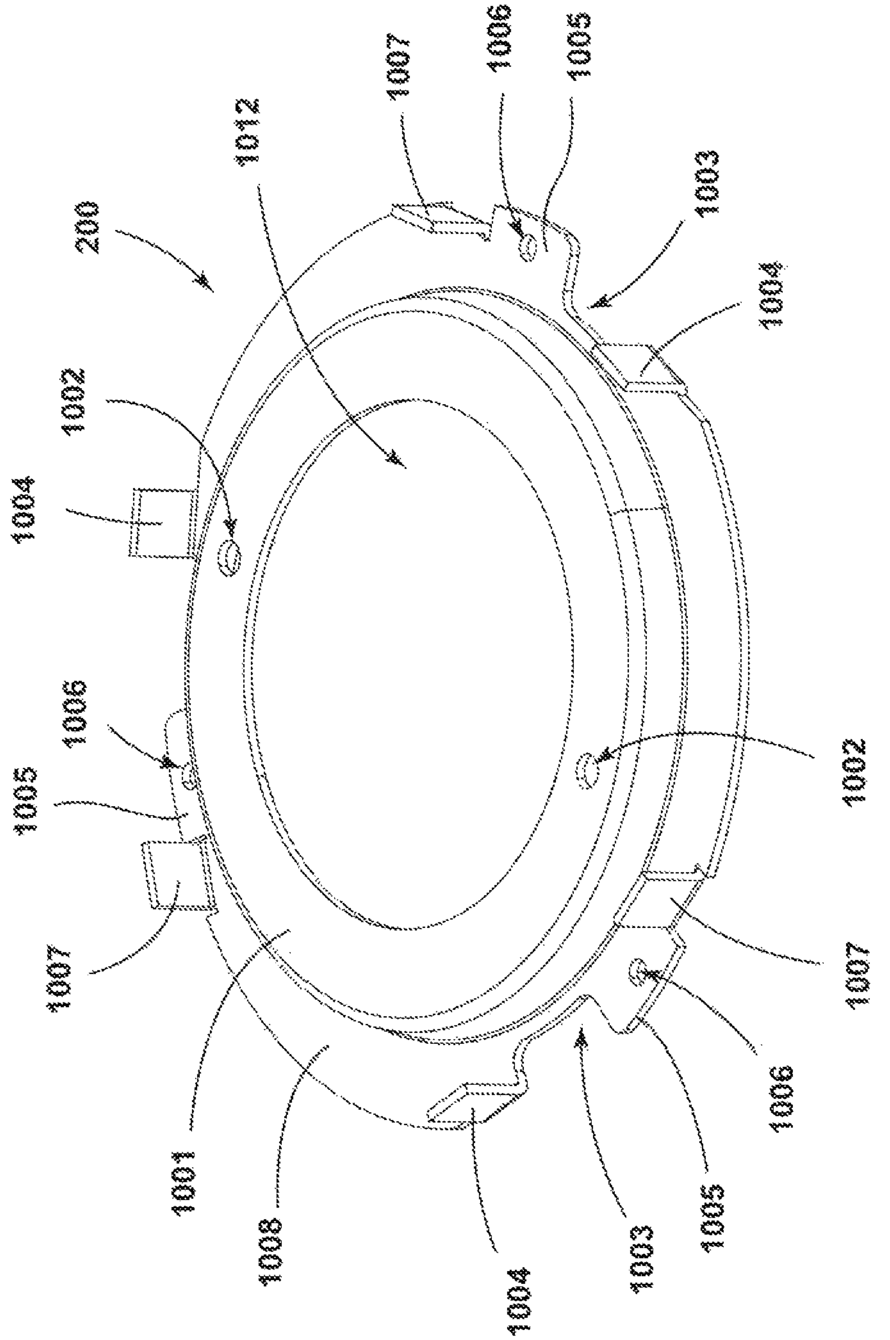
FIG. 4 is a top perspective view of a mounting ring of a modular luminaire assembly, according to various examples.

As shown in FIG. 4, the mounting ring 200 may be generally circular. However, it is contemplated that the mounting ring 200 may have other shapes without departing from the present disclosure. The mounting ring 200 may be formed of various materials, sufficient for structural and safety requirements, and may include a plurality pattern of embossed areas, tabs, and voids such as to create a pattern by which subsequent parts in the assembly 100 may be joined.

The mounting ring 200 includes a first portion 1001 extending about the circumference of the mounting ring 200 and having a base surface 1010. The first portion 1001 may be generally planar and defines a center opening 1012. The first portion 1001 may define one or more key hole slots 1002 configured to receive fasteners for coupling the mounting ring 200 with a mounting surface 1000 such as, for example, an electrical recess junction box (not shown) when the base surface 1010 is proximate the mounting surface 1000. As shown in FIG. 4, the key hole slots 1002 may be defined to be 180 degree opposite each other. It is contemplated that any number of key hole slots 1002 may be defined by the first portion 1001 without departing from the present disclosure. The key hole slots 1002 may be evenly spaced or may be unevenly spaced along the first portion 1001.

With continue reference to FIG. 4, the mounting ring 200 may have a second portion 1008 offset from the first portion 1001 and including a first surface 1020 and a second surface 1022. The second portion 1008 may define one or more slots 1003 configured to align with and at least partially receive extensions 1502 of the inner housing 201. Each slot 1003 may be defined in concert with one or more corresponding guide tabs 1004. Each guide tab 1004 extends from the second portion 1008 of the mounting ring 200 at an angle of about 90 degrees relative to the second surface 1022 of the second portion 1008.

A locking protrusion 1005 is positioned proximate each slot 1003 such that each locking protrusion 1005 at least partially defines the respective slot 1003. Each locking protrusion 1005 is coplanar with the second portion 1008 and extends at least partially along the second portion 1008. In various examples, the locking protrusions 1005 may extend radially outward from an outer edge of the second portion 1008. Each locking protrusion 1005 defines a receiving space 1006 configured to engage with a respective protrusion 1507 of the inner housing 201, as described in more detail elsewhere herein.

One or more stops 1007 may extend from the second portion 1008 of the mounting ring 200 at an angle of about 90 degrees relative to the second surface 1022 of the second portion 1008. Each stop 1007 is positioned proximate a respective locking protrusion 1005 on a side of the locking protrusion 1005 opposite of the slot 1003. In other words, the locking protrusion 1005 is positioned between the respective slot 1003 and the respective stops 1007. As illustrated, the stop 1007 may be a tab; however, it is contemplated that any stop may be used. Each stop 1007 may be configured to be substantially parallel to a center axis x of the luminaire assembly 100 when assembled.

Figure 5:
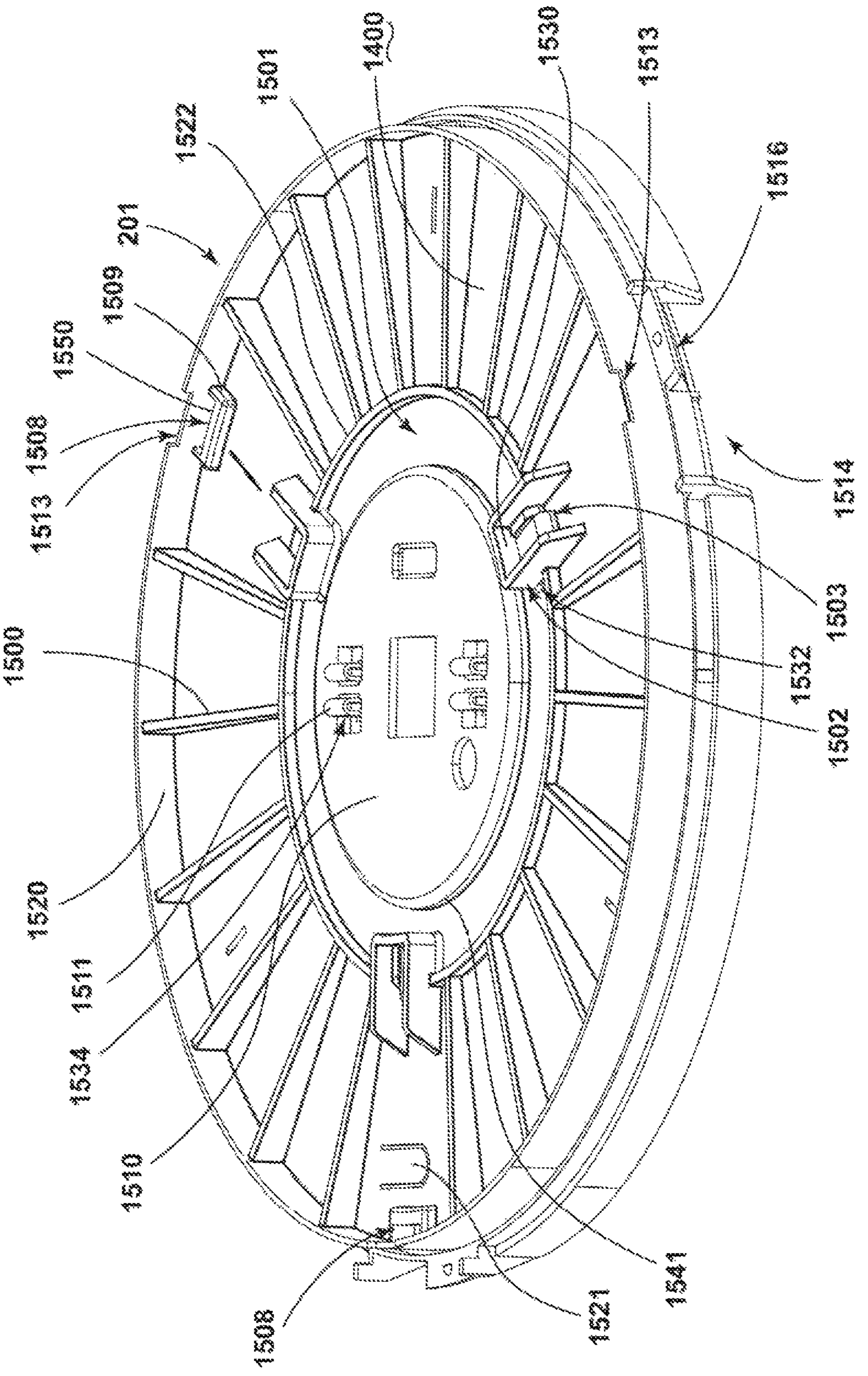
FIG. 5 is a top perspective view of an inner housing of a modular luminaire assembly, according to various examples.

Referring now to FIG. 5, the inner housing 201 is shown independent of the assembly 100. The inner housing 201 may be generally round and may be nominally flat and is configured to define the minimum size of the luminaire assembly 100. The inner housing 201 is formed of various materials that are electrically non-conductive, not limited to thermoset plastic, or metal. For example, the inner housing 201 may be formed of molded polymer materials. The inner housing 201 may further include a plurality of ribs 1500 extending outward from the first surface 1400. The plurality of ribs 1500 are arrayed radially about the axial center of the inner housing 201 and extend from an inner perimeter wall 1522 to an outward to an outer perimeter wall 1520.

The inner housing 201 includes a first surface 1400 and a second surface 1402, the first surface 1400 opposing the second surface 1402. A central plateau 1510 extends outward from the first surface 1400 such that the central plateau 1510 is offset from and parallel with the first surface 1400. The central plateau 1510 may be centered on the inner housing 201 and may be generally circular. The inner perimeter wall 1522 extends circumferentially about the inner housing 201 and is spaced apart from an edge 1541 of the central plateau 1510 to define a mounting channel 1501. In other words, the inner perimeter wall 1522 and the edge 1541 of the central plateau 1510 define the mounting channel 1501 with the central plateau 1510 defining the inner circumference of the mounting channel 1501 and the inner perimeter wall 1522 defining the outer circumference of the mounting channel 1501. The mounting channel 1501 extends about the axial center of the inner housing 201 and is configured to at least partially receive the second portion 1008 of the mounting ring 200.

Figure 6:
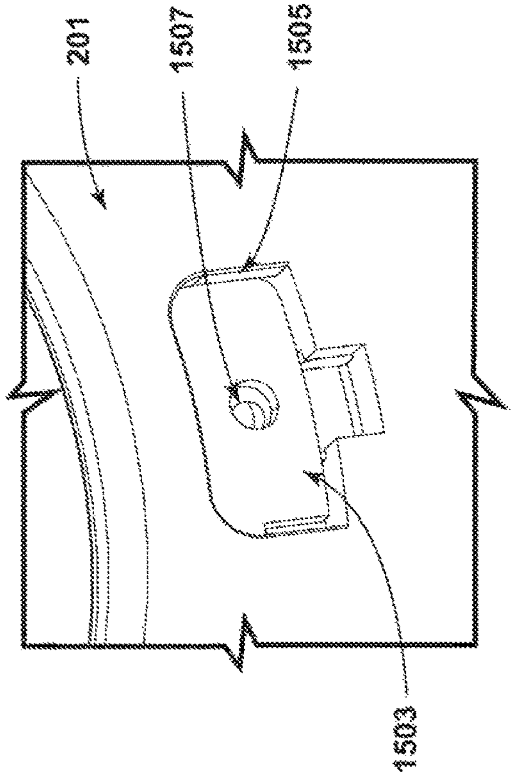
FIG. 6 is a partial bottom perspective view of the inner housing of FIG. 5 engaged with the mounting ring of FIG. 4.
Figure 7:
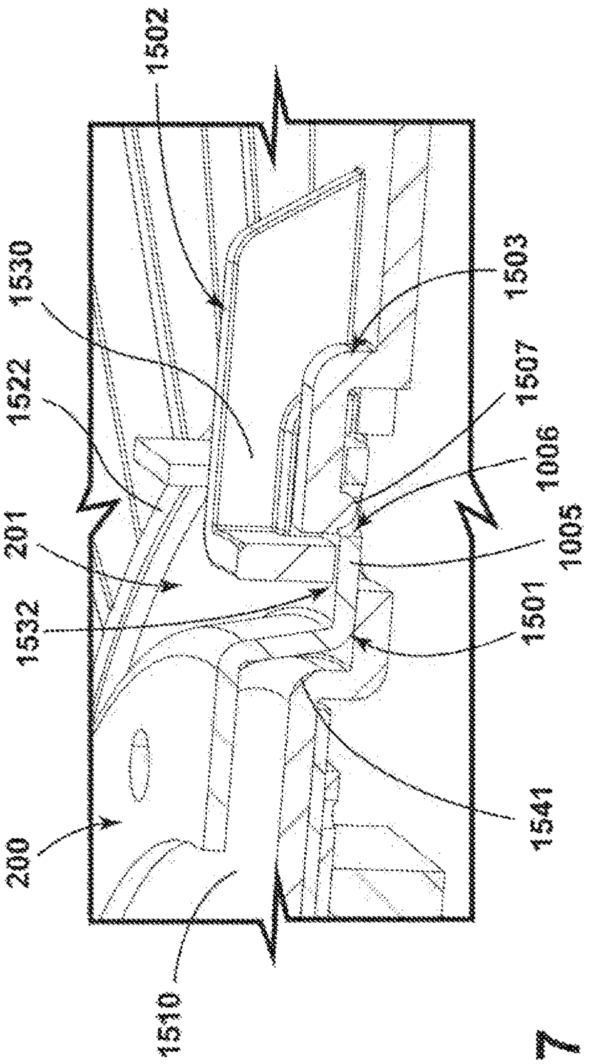
FIG. 7 is a partial cross-sectional view of the inner housing of FIG. 5 engaged with the mounting ring of FIG. 4.

As shown in FIGS. 5-7, one or more locking tabs 1503 are spaced along the inner perimeter wall 1522. The number of locking tabs 1503 may correspond to the number of locking protrusions 1005 of the mounting ring 200. Each locking tab 1503 extends radially inward toward the edge 1541 of the central plateau 1510. A protrusion 1507 extends substantially perpendicularly from an end of each locking tab 1503 toward the first surface 1400. Each protrusion 1507 may be rounded and is configured to be received by a corresponding receiving space 1006 of the mounting ring 200, as described in more detail elsewhere herein.

An extension 1502 extends at least partially about the respective locking tab 1503. Each extension 1502 includes a lip 1530 extending into the mounting channel 1501 and substantially parallel to the first surface 1400. The lip 1530 is spaced apart from the first surface 1400 to define a retention channel 1532 in communication with the mounting channel 1501. In various examples, the locking tabs 1503 and the extensions 1502 may be positioned equidistant radially along the inner perimeter wall 1522 the mounting channel 1501. In other examples, the locking tabs 1503 and extensions 1502 may be unevenly spaced about the inner perimeter wall 1522. Each retention channel 1532 is configured to receive one of the locking protrusions 1005 of the mounting ring 200.

Figure 8:
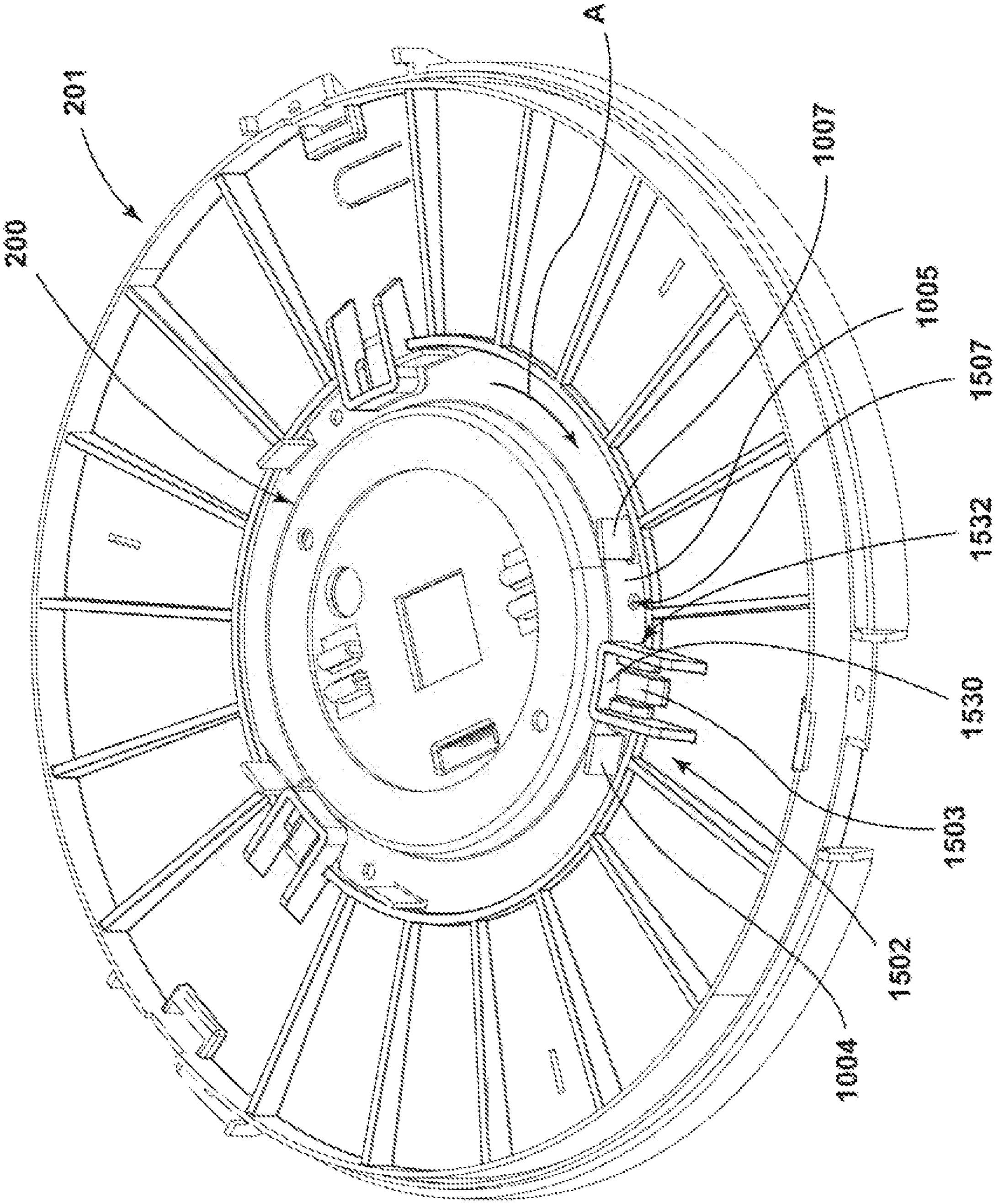
FIG. 8 is a top perspective view of the inner housing of FIG. 5 and the mounting ring of FIG. 4 in a first position.
Figure 9:
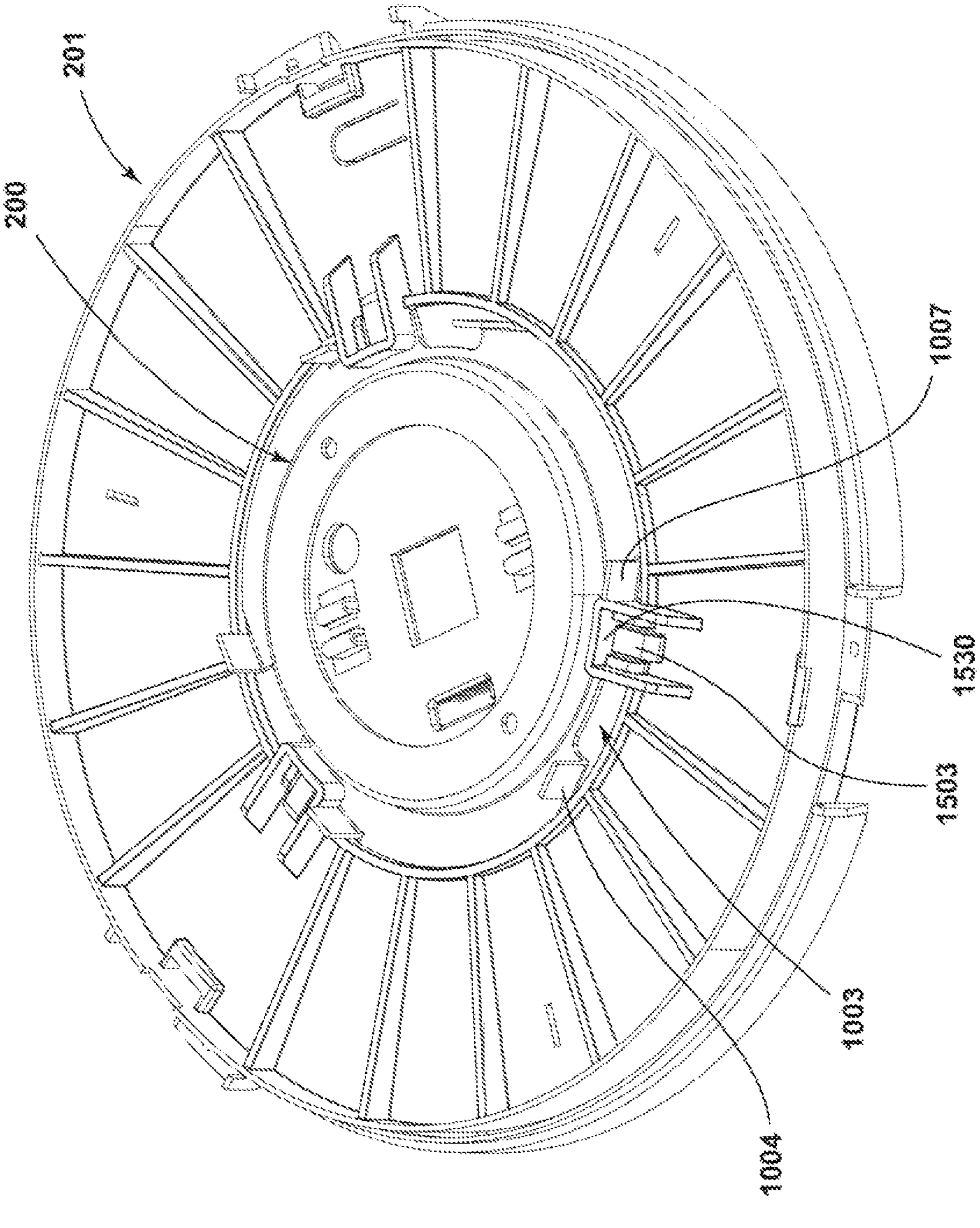
FIG. 9 is a top perspective view of the inner housing of FIG. 5 and the mounting ring of FIG. 4 in a second position.

As shown in FIGS. 8 and 9, to couple the mounting ring 200 with the inner housing 201, the extensions 1502 of the inner housing 201 are aligned with the slots 1003 of the mounting ring 200. The guide tabs 1004 are configured to at least partially abut the inner perimeter wall 1522 of the inner housing 201 to guide alignment of the mounting ring 200 for insertion into the mounting channel 1501. When the mounting ring 200 is positioned within the mounting channel 1501, the first surface 1020 of the second portion 1008 of the mounting ring 200 is at least partially in contact with the inner housing 201 and the extensions 1502 of the inner housing 201 are received by the slots 1003 (FIG. 8). Each locking protrusion 1005 of the mounting ring 200 is aligned with a respective retention channel 1502. The mounting ring 200 is then rotated in a first direction, as shown by arrow A, and each locking protrusion 1005 is received by the respective retention channel 1502 (FIG. 9).

When the locking tab 1503 contacts the locking protrusion 1005, the protrusion 1507 is biased upward until the protrusion 1507 is aligned with the receiving space 1006. The locking tab 1503 then snap engages with the locking protrusion 1005, as best shown in FIG. 6. At the completion of the insertion the mounting ring 200 into the mounting channel 1501 and rotation of the mounting ring 200 relative to the inner housing 201, each stop 1007 contacts the respective extension 1502 to prevent over rotation of the mounting ring 200 in the first direction past the point of snap engagement with the inner housing 201. To disengage the mounting ring 200 from the inner housing 201, the mounting ring 200 may be rotated in a second direction opposite the first direction.

Referring again to FIG. 5, one or more pairs of bayonet snap tabs 1511 may be positioned on the central plateau 1510 of the inner housing 201. Each pair of bayonet snap tabs 1511 is arrayed in parallel with respect to each other pair and may be located equidistantly from the axial center point. The central plateau 1510 defines a space 1534 aligned with each bayonet snap tab 1511 such that the pairs of bayonet snap tabs 1511 extend through the space 1534 and away from a second surface 1402 of the inner housing 201. For each pair of bayonet snap tabs 1511, each bayonet snap tab 1511 is arranged as to orient a retention barb 1512 outwardly and away from the other bayonet snap tab 1511 of the pair. Each pair of bayonet snap tabs 1511 is configured to index the orientation of the thermal plate 203 and the driver assembly 204 during installation, as described in more detail elsewhere herein.

With continued reference to FIG. 5, a plurality of indexing locator notches 1513 may be distributed radially about the outer perimeter wall 1520 of the inner housing 201. Each notch 1513 may extend from an edge of the outer perimeter wall 1520 toward the first surface 1400 of the inner housing 201. In various examples, the locator notches 1513 may be configured to index the location of an optional nightlight assembly 300, as discussed in more detail elsewhere herein.

The inner housing 201 may further define a plurality of receiving spaces 1508 proximate the outer perimeter wall 1520. Each receiving space 1508 is aligned with a respective notch 1513. In various examples, the receiving space 1508 may be generally rectangular and may be framed by a wall 1509 extending from the first surface 1400 of the inner housing 201. The wall 1509 may be coupled with or integrally formed with the outer perimeter wall 1520 and may extend about three sides of the respective receiving space 1508, two sides of the respective receiving space 1508, or one side of the respective receiving space 1508. Each wall 1509 may include a lip 1550 extending perpendicularly from the wall 1509 toward the center of the receiving space 1508.

Figure 10:
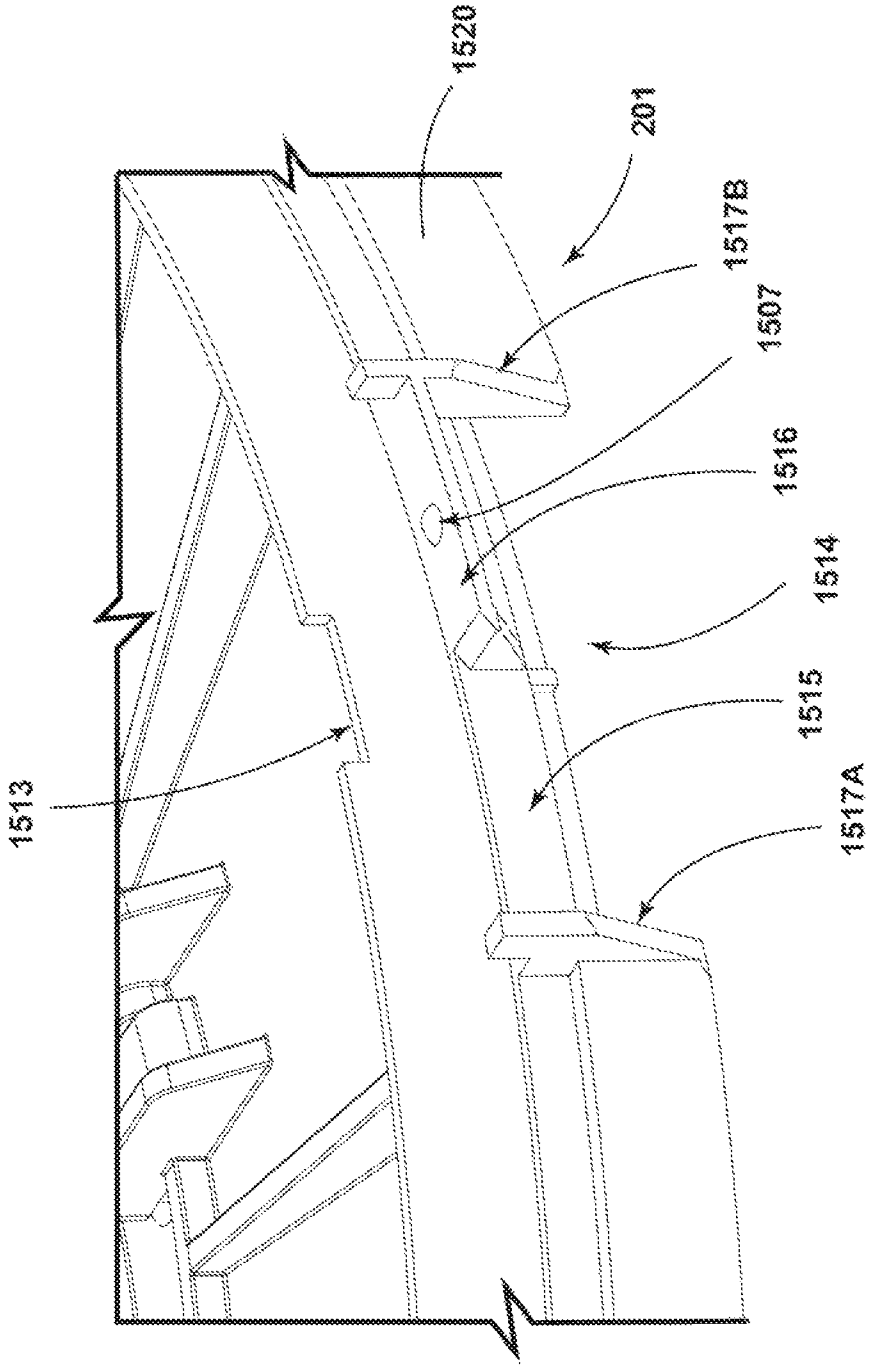
FIG. 10 is a partial perspective view an outer perimeter wall of the inner housing of FIG. 5.

As best shown in FIG. 10, the inner housing 201 may further include a plurality of index stops 1517A, 1517B positioned in pairs on the outer perimeter wall 1520. Each index stop 1517A, 1517B may extend from an anterior face of the perimeter wall 1520. The index stops 1517A, 1517B may be positioned as pairs such that one index stop 1517A is on a first edge of a respective opening 1514 defined by the outer perimeter wall 1520 and the other index stop 1517B is on an opposite edge of the respective opening 1514. The pairs of index stops 1517A, 1517B and the respective openings 1514 may be arrayed equidistantly radially about an anterior face of the outer perimeter wall 1520. Alternatively, the pairs of index stops 1517A, 1517B and the respective openings 1514 may be spaced unevenly about the outer perimeter wall 1520.

The inner housing 201 may further include a plurality of indexing face frame mounting flanges 1516 extending along a portion of the circumference of the outer perimeter wall 1520. Each mounting flange 1516 may correspond with a respective opening 1514 and pair of index stops 1517A, 1517B and may extend at least partially along an upper edge of the respective opening 1514 in a direction perpendicular to the respective index stops 1517A, 1517B. Each mounting flange 1516 may be coupled with or integrally formed with one of the index stops 1517A, 1517B of the respective pair of index stops. A protrusion 1507 may extend from the mounting flange 1516 in a direction parallel with the index stops 1517A, 1517B. A smaller insertion opening 1515 is defined between the mounting flange 1516 and the other of the index stops 1517A, 1517B. The smaller insertion opening 1515 is configured to at least partially receive the bezel 402 to engage with the protrusion 1507 and couple the bezel 402 with the inner housing 201, as discussed in more detail elsewhere herein.

Figure 12:
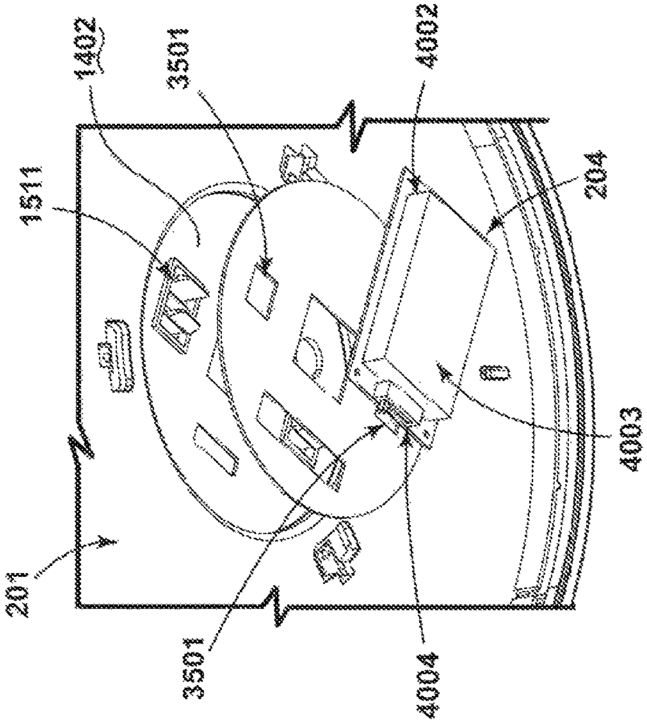
FIG. 12 is a bottom perspective view of the thermal plate and the driver assembly of FIG. 11 separated from the inner housing of FIG. 5.
Figure 11:
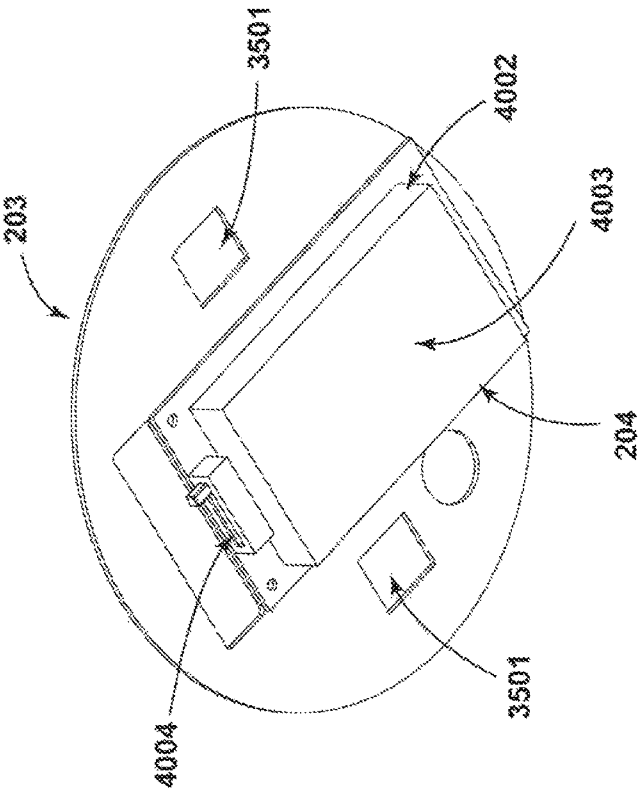
FIG. 11 is a bottom perspective view of a thermal plate and a driver assembly of a modular luminaire assembly, according to various examples.
Figure 13:
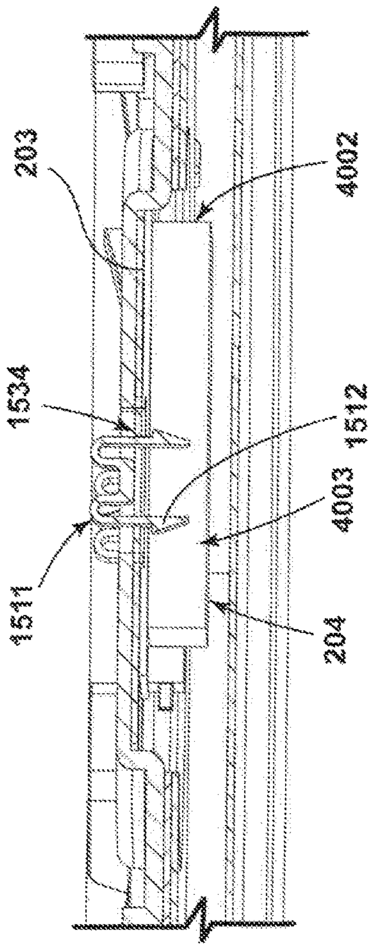
FIG. 13 is a partial cross-sectional view of the thermal plate and the driver assembly of FIG. 11 coupled with the inner housing of FIG. 5.

Referring now to FIGS. 11 and 12, the thermal plate 203 may be assembled anteriorly to the inner housing 201 upon a plane perpendicular to the axial centerline of the luminaire assembly 100. The thermal plate 203 may define a plurality of rectilinear openings 3501 configured to receive the bayonet snap tabs 1511 of the inner housing 201 to couple the thermal plate 203 with the inner housing 201. When the thermal plate 203 and the driver assembly 204 are coupled with the inner housing 201, each bayonet snap tab 1511 is placed into deflection position during insertion of the tab 1511 through the respective opening 3501 of the thermal plate 203. After the retention barb 1512 of the tab 1511 is has passed through the respective opening 3501, the tab 1511 is configured to return to a static position, retaining the plate 203 by interference fit, as best shown in FIG. 13. When the bayonet snap tabs 1511 are received by the openings 3501, the thermal plate 203 may be positioned parallel to, and, in various examples, in contact with, the second surface 1402 of the inner housing 201.

Referring again to FIGS. 11 and 12, the power converter supply assembly 204 may be coupled with the thermal plate 203 using screws, barbs, rivets or other coupling means. The power converter supply assembly 204 is nominally composed of a solid-state circuit and components, installed to a printed circuit board ("PCB") 4002, by which main AC voltages are received, converted to DC, and supplied by multiple circuit channels to the LED printed circuit board assembly ("PCBA") arrays. The power converter supply assembly 204 may be covered with a non-combustible cover 4003, which may be polymer or metal in composition. It is contemplated that embodiments of the power converter supply assembly 204 may be configured to alter the output of the LED PCBA arrays in intensity, through changes of sinewave phases sent from the power converter supply assembly 204 to the LED PCBA 205, or segregate amounts of output power to various parallel LED circuits upon the PCBA array using mechanical or electro-mechanical slide switches 4004, or radio frequency means (not shown). This alteration may cause certain series of LED to illuminate at differing intensities with respect to other series being illuminated at the same time. Varying output may allow a user to operate the luminaire assembly 100 at a color correlated temperature pleasing to the user. It is further contemplated that embodiments of the power converter supply assembly 204 may include circuit and components configured to allow sensors to be added to the printed circuit board 4002. These sensors may include, for example, occupancy sensors, or CO 2 sensors.

Figure 14:
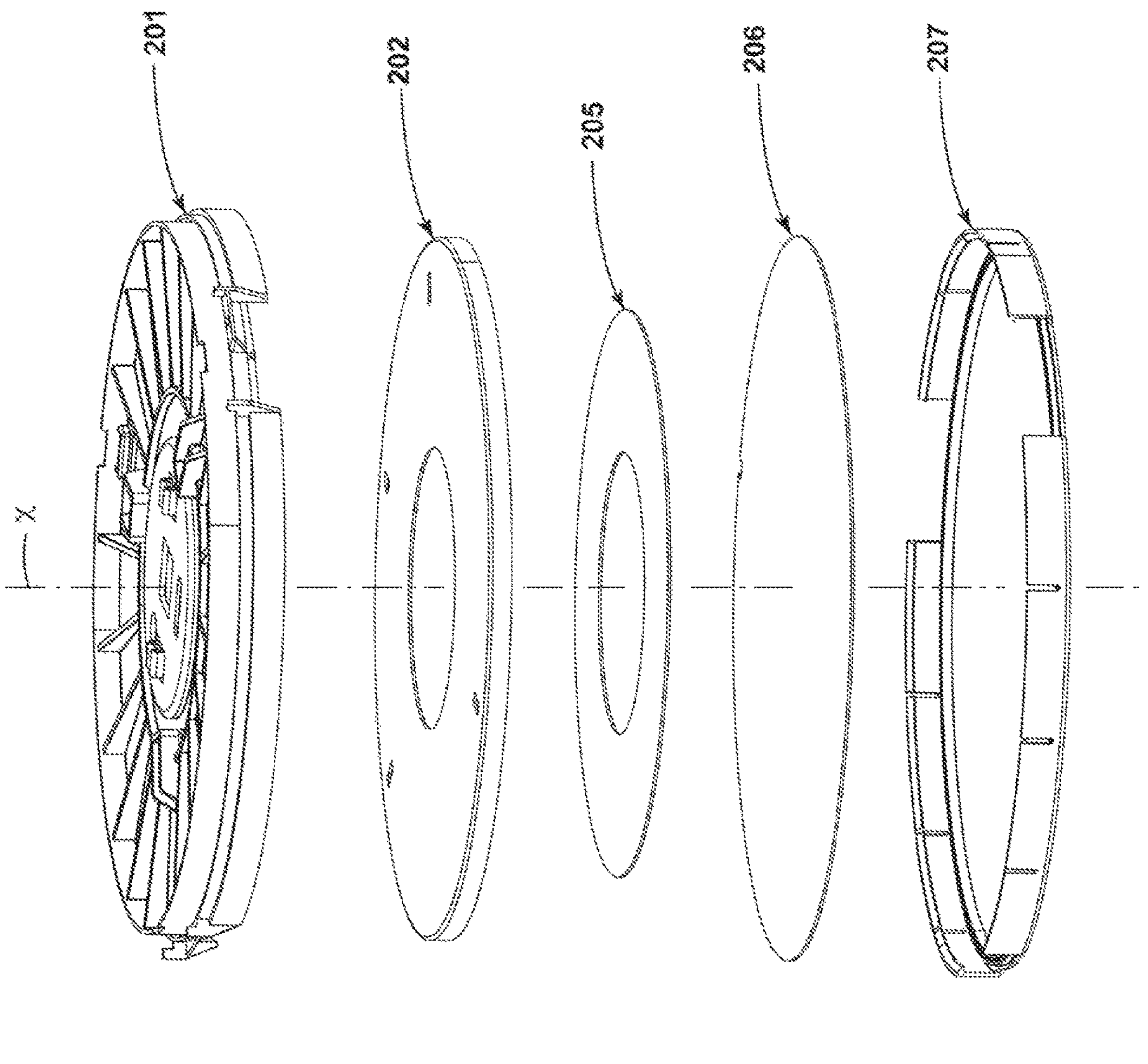
FIG. 14 is an exploded view of the inner housing of FIG. 5, a thermal pan, a lighting assembly, a diffuser, and a retaining ring, according to various examples.
Figure 15:
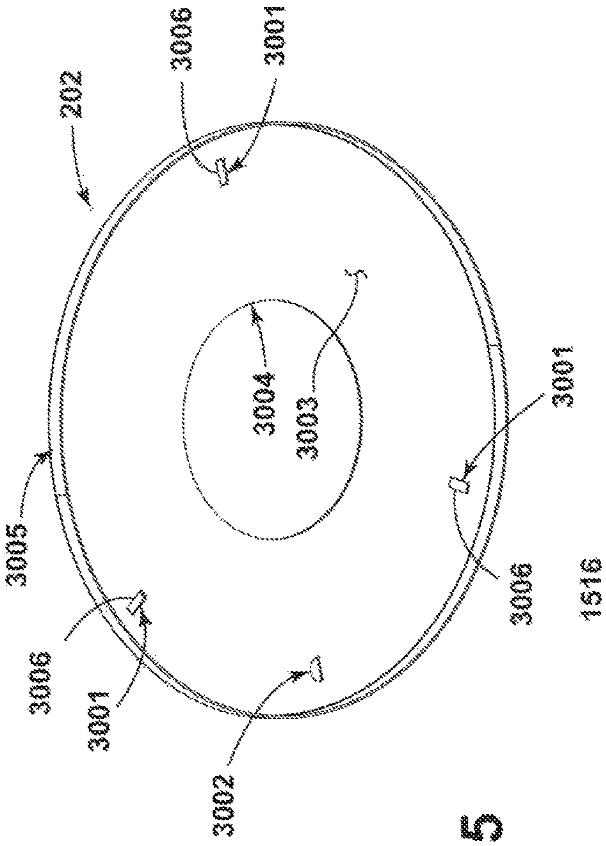
FIG. 15 is a bottom perspective view of the thermal pan of FIG. 14.

As shown in FIGS. 14 and 15, the assembly 100 further includes a thermal pan 202 configured to disperse heat from a co-planarly affixed LED PCBA array 205. In various examples, the thermal pan 202 may include a pan body 3003 defining a plurality of openings 3001. Each of the openings 3001 may be defined by at least one edge 3006.

Figure 16:
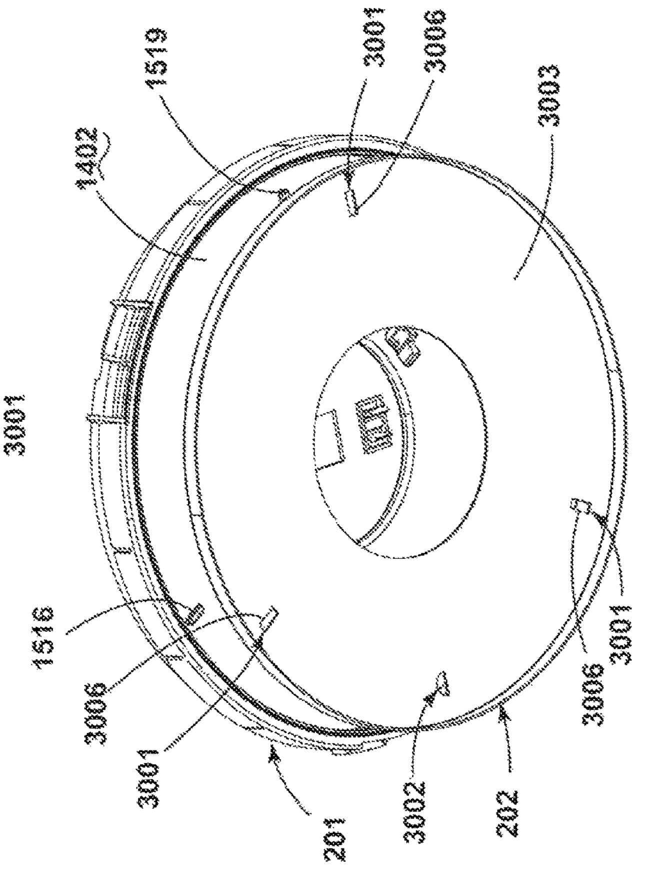
FIG. 16 is a bottom perspective view of the thermal pan of FIG. 14 spaced apart from the inner housing of FIG. 14.
Figure 17:
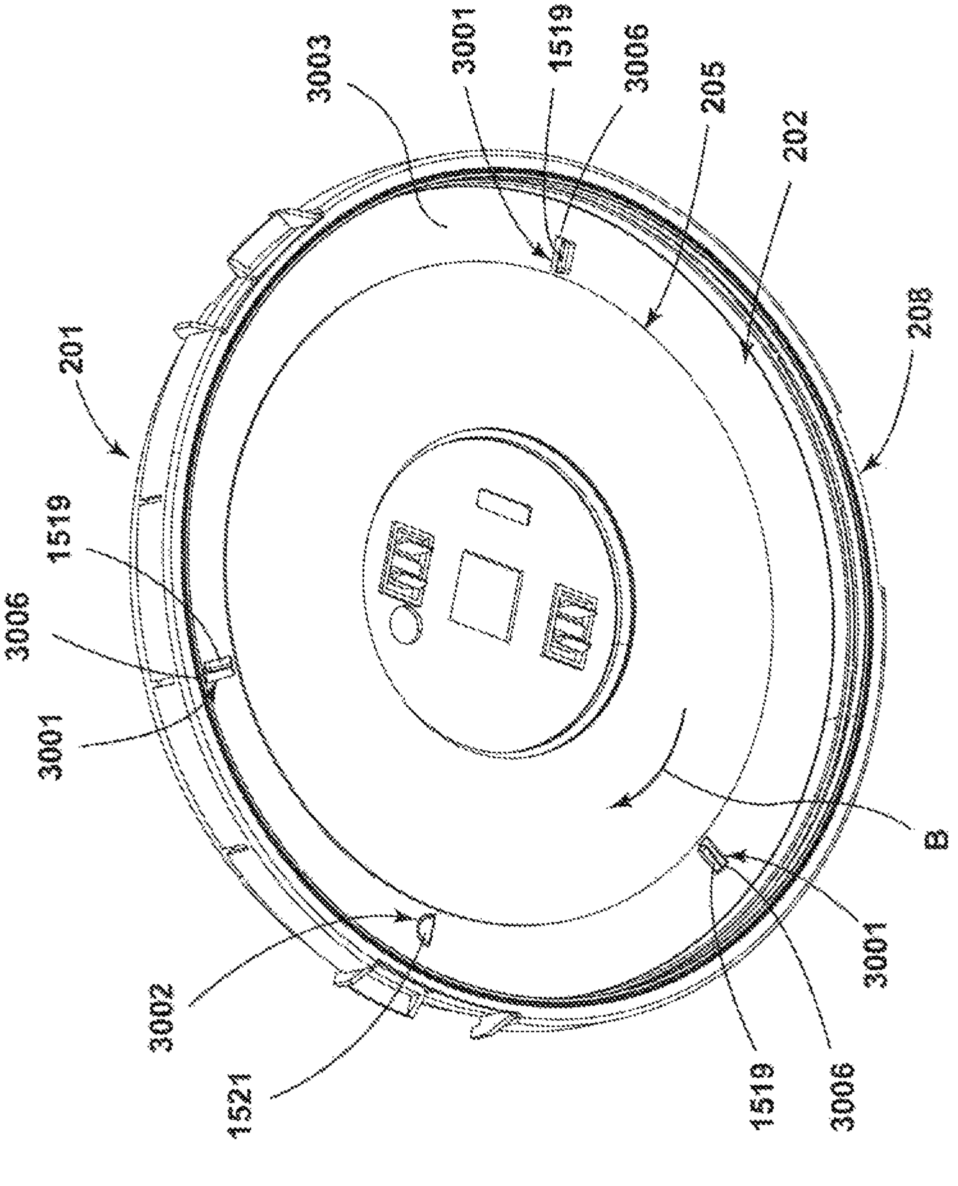
FIG. 17 a bottom perspective view of the thermal pan of FIG. 14 coupled with the inner housing of FIG. 14.

As best shown in FIGS. 16 and 17, the inner housing 201 further includes a plurality of mating cleats 1519 extending outward from the second surface 1402. Each of the mating cleats 1519 may have a generally L-shaped cross section and may be configured to engage with the thermal pan 202. Each of the openings 3001 of the pan body may be configured to receive a respective mating cleat 1519 of the inner housing 201. The mating cleats 1519 of the inner housing 201 are configured to engage with the edge 3006 proximate the respective opening 3001 when the thermal pan 202 is rotated, as shown in FIGS. 16 and 17. The engagement of the mating cleats 1519 with the edges 3006 is configured to couple the thermal pan 202 with the inner housing 201. The inner housing 201 may further include a snap-engaging stop tab 1521 configured to snap engage with an opening 3002 of the thermal pan 202 to prevent counter rotation of the thermal pan 202 relative to the inner housing 201, as described in more detail elsewhere herein.

As shown in FIG. 14, the body 3003 of the thermal pan 202 may further define a central opening 3004 configured to be aligned with the central axis x of the assembly 100. The opening 3004 is defined concentrically within the pan body 3003 of the thermal pan 202 and is configured to receive the power converter assembly 204. This allows the thermal pan 202 to pass over the power converter supply assembly 204 during manufacturing assembly. The pan body 3003 may further define a stop receiving space 3002 configured to receive the stop tab 1521 of the inner housing 201, as described in more detail elsewhere herein.

The thermal pan 202 may further include a perimeter flange 3005 extending about at least a portion of the circumference of the pan body 3003. The perimeter flange 3005 extends axially from the edge of the pan body 3003 and may continuous or discontinuous. The perimeter flange 3005 is configured to act as a structural spacer for separating the LED PCBA 205 from the interior diffuser 206. In other words, the as described in more detail elsewhere herein.

Referring still to FIG. 14, the LED PCBA 205 may be configured as a substantially flat disc or plate aligned perpendicular to the fixture axially, and parallel with and coupled to the thermal pan 202. The LED PCBA 205 may include a plurality of LED components interconnected electrically and configured to direct illumination perpendicularly toward the anterior of the luminaire assembly 100. It is contemplated that LED PCBA 205 may have any shape configured to position the LED PCBA 205 in contact and/or flush with the pan body 3003 thermal pan 202. The LED PCBA 205 may be installed symmetrically in different orientations to utilize optic orientation for diverse lighting effects.

As shown in FIGS. 16 and 17, during assembly, the thermal pan 202 is brought into alignment with the second surface 1402 of the inner housing 201 and the plurality of openings 3001 are aligned with the respective mating cleats 1519 of the inner housing 201. The mating cleats 1519 are inserted into the respective openings 3001. The thermal pan 202 is rotated in a first direction (as shown by arrow B) to engage each of the mating cleats 1519 of the inner housing 201 with the edge 3006 of the respective opening 3001. Coupling of the thermal pan 202 with the inner housing 201 is configured to subsequently couple the LED PCBA 205 with the inner housing 201.

Once the thermal pan 202 is coupled with the inner housing 201 through the engagement of the mating cleats 1519 and the openings 3001, the stop tab 1521 of the inner housing 201 is configured to snap engage with the stop receiving space 3002 of the thermal pan 202 (FIG. 17). The engagement of the stop tab 1521 with the stop receiving space 3002 is configured to inhibit rotation of the thermal pan 202 in a second direction opposite. The second direction is opposite the first direction. To disengage the thermal pan 202 from the inner housing 201, the stop tab 1521 may be configured to be selectively disengaged from the stop receiving space 3002 so that the thermal pan 202 may be rotated in the second direction.

Figure 18:
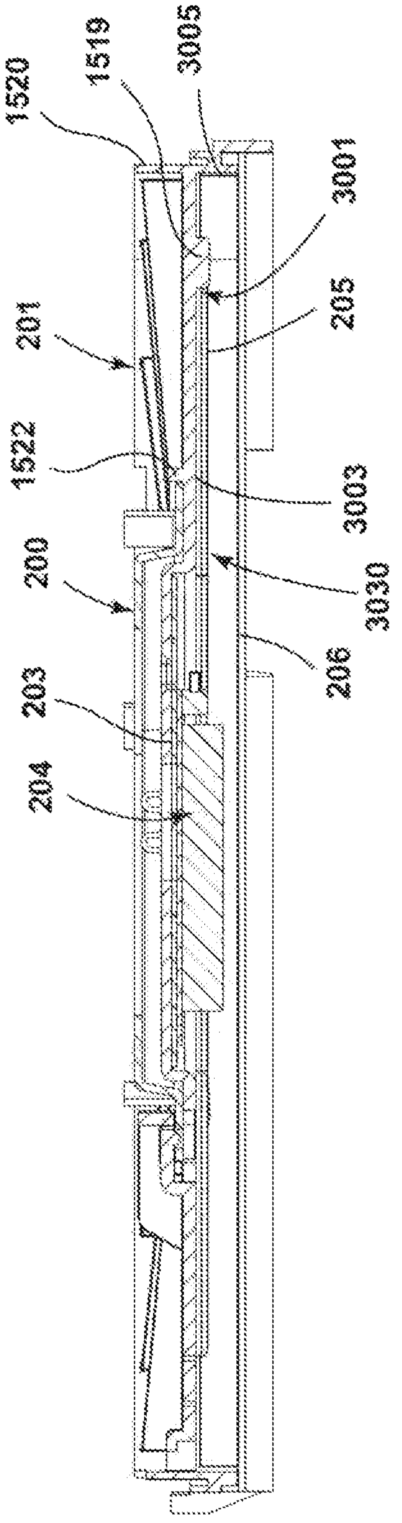
FIG. 18 is a cross-sectional view of the thermal pan and inner housing of FIG. 17.

Referring now to FIG. 18, as previously introduced, the perimeter flange 3005 is configured to provide a structural spacer holding the PCBA 205 at a fixed distance from the interior diffuser 206. The perimeter flange 3005 is also configured to define an optical mixing chamber 3030 depth by which the LED beam spread will create a uniformity of photons simultaneously striking the diffuser 206. This uniformity may avoid over-lit or underlit areas of the diffuser 206.

As shown in FIG. 18, the LED PCBA 205 is coupled with the pan body 3003 of the thermal pan 202. In various examples the LED PCBA 205 may be coupled with the thermal pan 202 using toolless stand offs and rivets, common to one familiar with the art of electronic assemblies. The toolless stand offs and rivets correspond to hole patterns defined by the pan body 3003 of the thermal pan 202. When the LED PCBA 205 is coupled with the pan body 3003, the perimeter flange 3005 extends at least partially about the LED PCBA 205.

Figure 19:
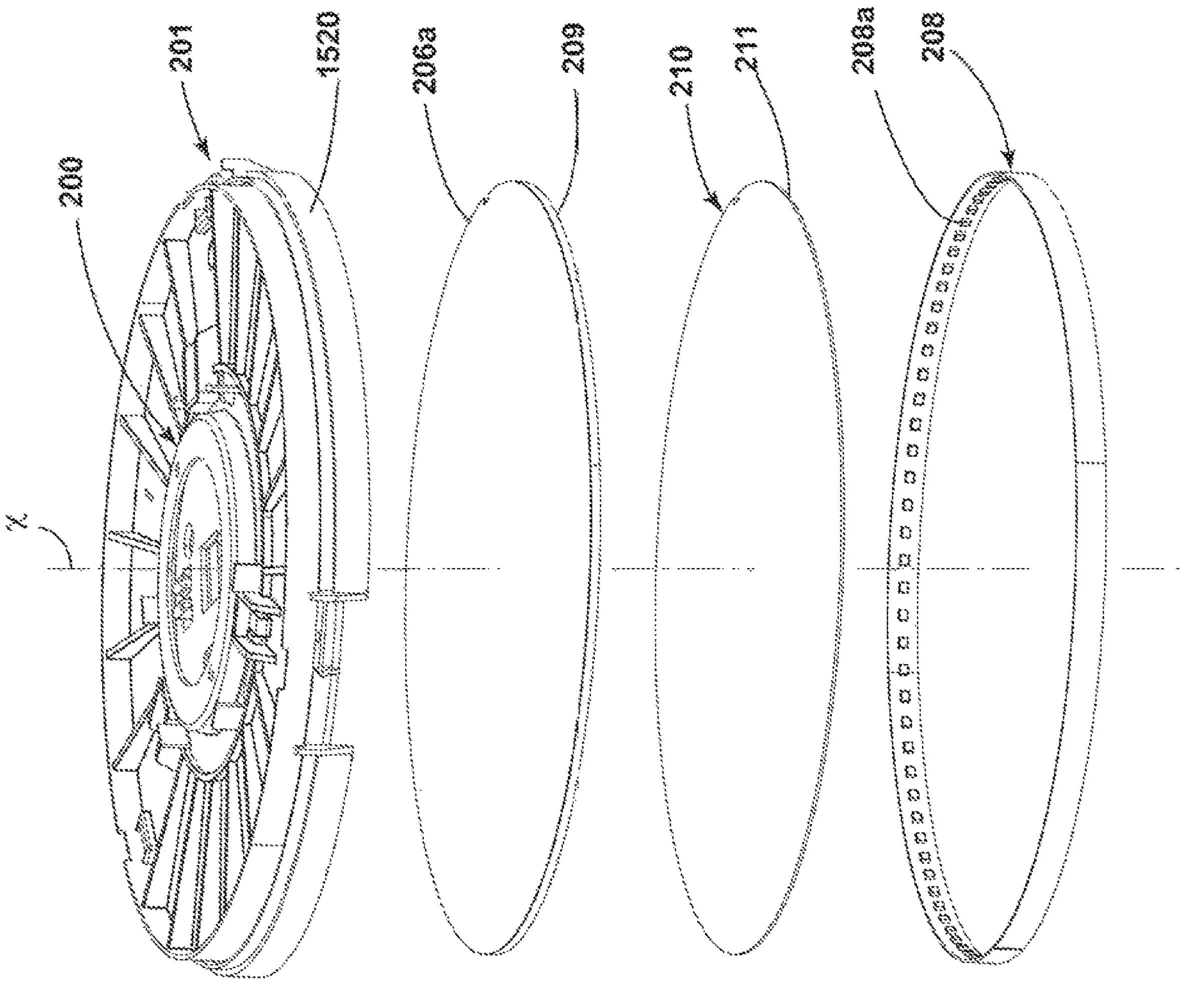
FIG. 19 is an exploded view of the inner housing of FIG. 5, a diffuser, a light guide plate, and a lighting assembly, according to various examples.
Figure 20:
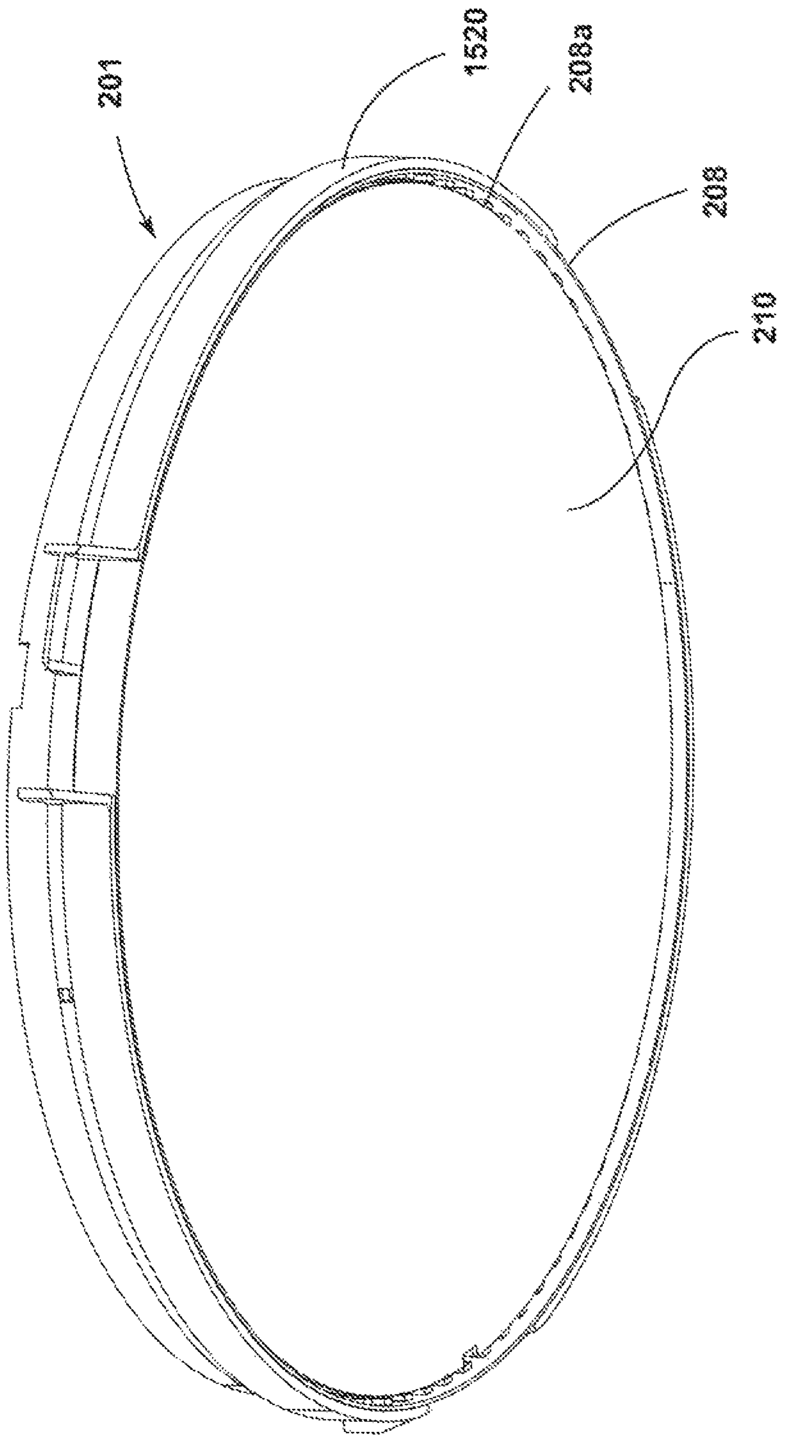
FIG. 20 is a bottom perspective view of the inner housing coupled with the diffuser, the light guide plate, and the lighting assembly of FIG. 19.

As previously described, in various examples, the LED PCBA 205 may be configured as a primary means of illumination. As shown in FIGS. 19 and 20, the assembly 100 may include an LED PCBA strip 208 configured as an alternate means of illumination for the assembly 100. It is contemplated that any combination of the LED PCBA 205, the thermal pan 202, and the LED PCBA strip 208 may be used without departing from the scope of the present disclosure.

The LED PCBA strip 208 may be installed radially about an inner face of the outer perimeter wall 1520 of the inner housing 201 and may extend along the outer perimeter wall 1520 in a direction substantially parallel to a center axis of the housing 201. The LED PCBA strip 208 may be nominally longer in length than width and includes a plurality of LED components **208*a* connected by electrical circuit. In various examples, the plurality of LED components 208*a* may be affixed in a single row. Alternatively, the plurality of LED components 208***a* may be affixed in multiple rows. The LED PCBA strip 208 may be configured to the LED emitter toward the center axis x.

When the plurality of LED components 208*a* are activated, light is radiated into an edge 211 of a light guide plate 210. The light may be configured to be refracted 90 degrees by an etching of a surface of a light guide plate 210. The refracted light may be directed through a diffuser 206*a* configured to act as a lens, toward an anterior face of the luminaire assembly 100. It is contemplated that the LED PCBA strip 208 may be used in place of or in conjunction with the thermal pan 202 and LED PCBA 205 may not be not utilized. A reflector sheet 209 may be applied to the posterior plane of the light guide plate 210 to inhibit illumination loss through internal planes, more effectively reflecting the output of illumination as to increase the output of light. The advantage of the LED PCBA strip 208 is that the strip 208 is configured to allow for a lower overall product height owing to not requiring a light mixing chamber as occurring in the former means of illumination.

Figure 21:
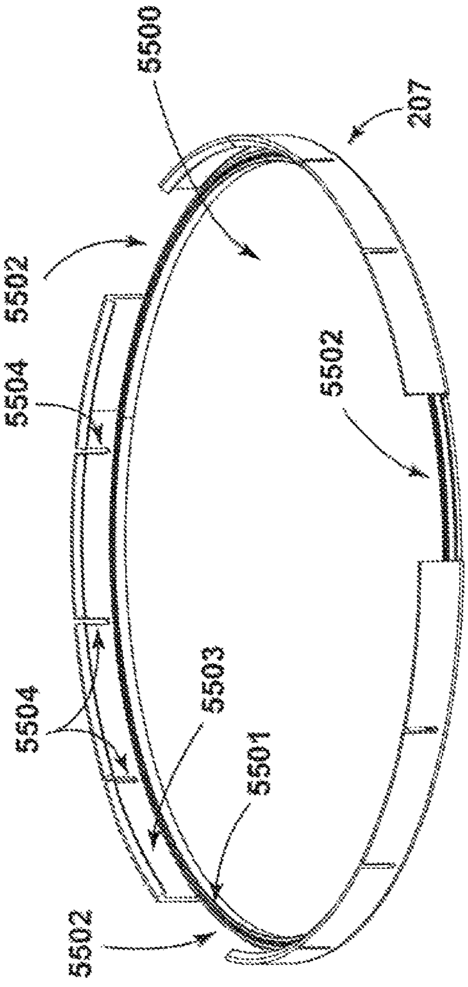
FIG. 21 is a top perspective view of a retaining ring, according to various examples.

As shown in FIG. 21, the assembly 100 further includes the fixture retaining ring 207. The fixture retaining ring 207 includes a ring body 5501. The ring body 5501, having a posterior surface, is used to create an aperture 5500 smaller than part diameters of the outer diffuser 403 and the interior diffuser 206, allowing the fixture retaining ring 207 to secure said diffusers 206, 403 along the posterior surface, when fully engaged to the inner housing 201.

A plurality of snap flanges 5503 are positioned along an outer edge of the ring body 5501 and protruding parallel to the primary axial orientation. Each of the plurality of snap flanges 5503 may define one or more blade slots 5504 extending along the axial length of the snap flange 5503. Each snap flange 5503 may define any number of blade slots 5504. The blade slots 5504 may be evenly or unevenly spaced along the circumferential length of the respective snap flange 5503. The spacing of the blade slots 5504 may be configured to allow for the snap flanges 5503 to flex when the fixture retaining ring 207 is engaged with the inner housing 201 during assembly.

The plurality of snap flanges 5503 may further be spaced apart to define a plurality of voids 5502. The plurality of voids 5502 may be configured to act as first indexing locators to align the fixture retaining ring 507 with the inner housing 201 during assembly. The plurality of voids 5502 may also be configured to at least partially receive the bezel assembly 400, as described in more detail elsewhere herein.

Figure 22:
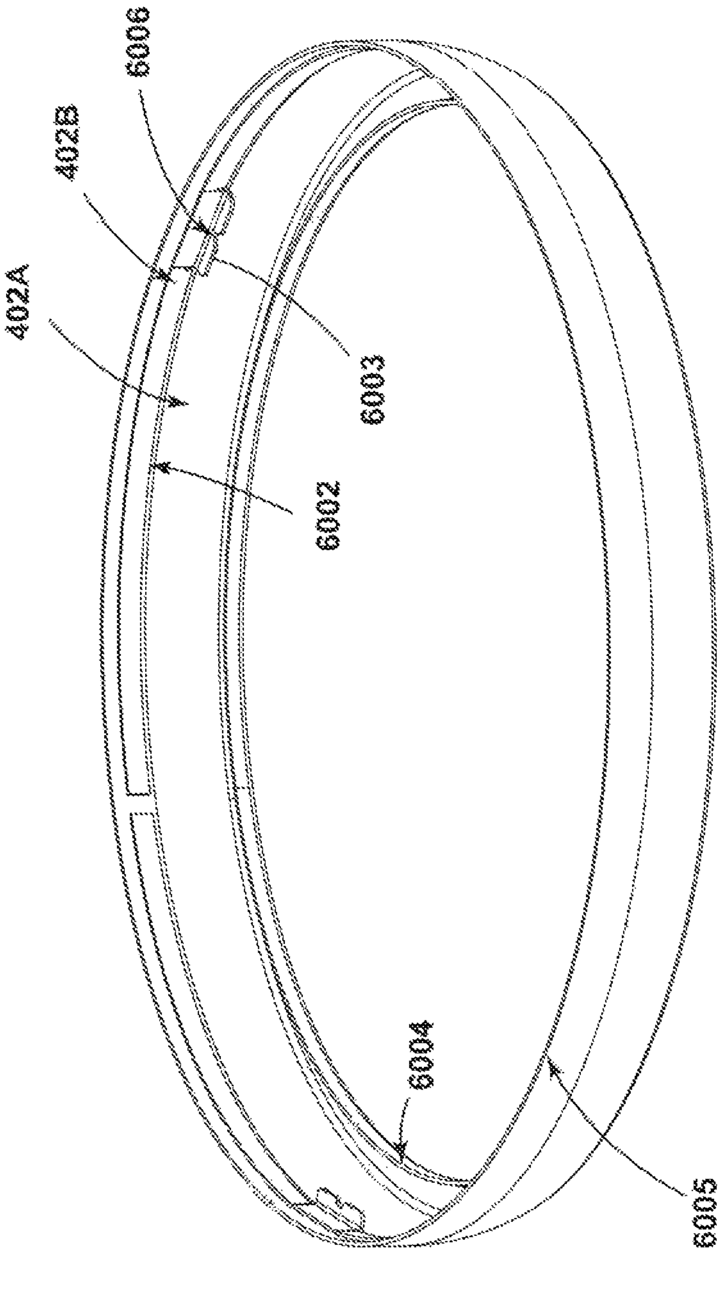
FIG. 22 is a top perspective view of a bezel assembly, according to various examples.

As shown in FIG. 22, the assembly 100 may further include a bezel assembly 400 including an outer bezel 402A coupled with an internal bezel metal ring 402B. The appearance of the bezel assembly 400 may be changed by changing the appearance of the outer bezel 402A. The outer bezel 402A may have a nominally a circular shape with an anterior face 6004. The anterior face 6004 of the outer bezel 402A may be positioned to cover the space between the outer diffuser 403 and the mounting surface 1000. The outer bezel 402A further includes a posterior edge 6005. The internal bezel metal ring 402B may be configured as a circular band including a surface 6002 axially parallel to the center assembled axis of the assembly 100. A plurality of décor bezel mounting tabs 6003 may be arrayed equidistantly radially about the bezel ring 402B. The décor bezel mounting tabs 6003 extend at right angle to the circular band 6002 toward the center axis. Each tab 6003 features an indexing notch 6006 centered on an edge of the tab 6003.

Figure 23:
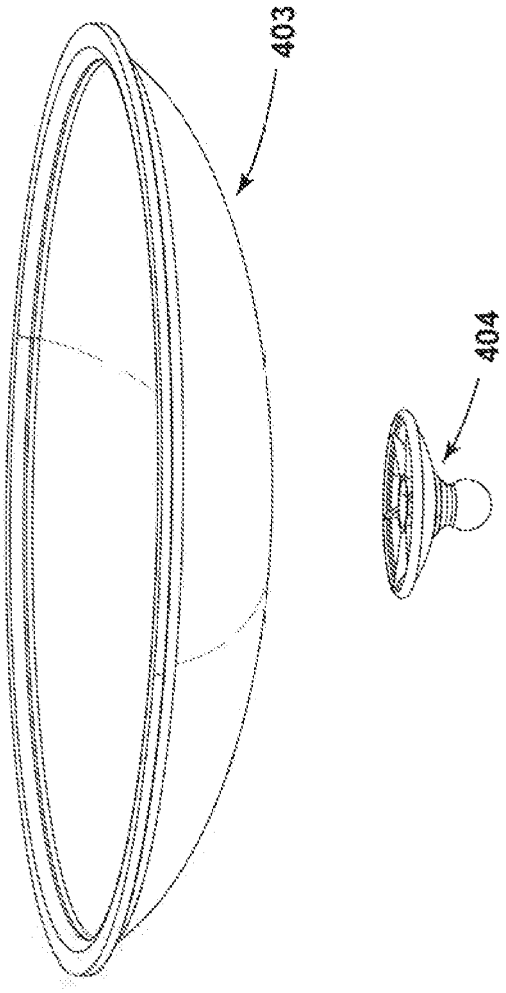
FIG. 23 is a top perspective view of an outer diffuser and optional coupling assembly, according to various examples.

Referring now to FIG. 23, the assembly 100 further includes the outer diffuser 403 and a coupling assembly 404.

The outer diffuser 403 may be embodied in various forms, colors and textural effects as to create a desirable disbursement of light and appearance of the translucent membrane. The coupling assembly 404 may be affixed in certain embodiments as a desirable accent element, the mounting of which may be mechanical fit through an opening in the décor diffuser 403, secured by a locking hex nut fastener, or by other means to one schooled in such art. In various examples, the outer diffuser 403 may further include a reflector, a light guide plate, and/or a lens. In other examples, the lens 206 may be configured to act as a outer diffuser 403 to reduce overall assembly height by use of the alternate emitter embodiment of edge lit LED PCBA 208 as room side lighting.

Figure 24:
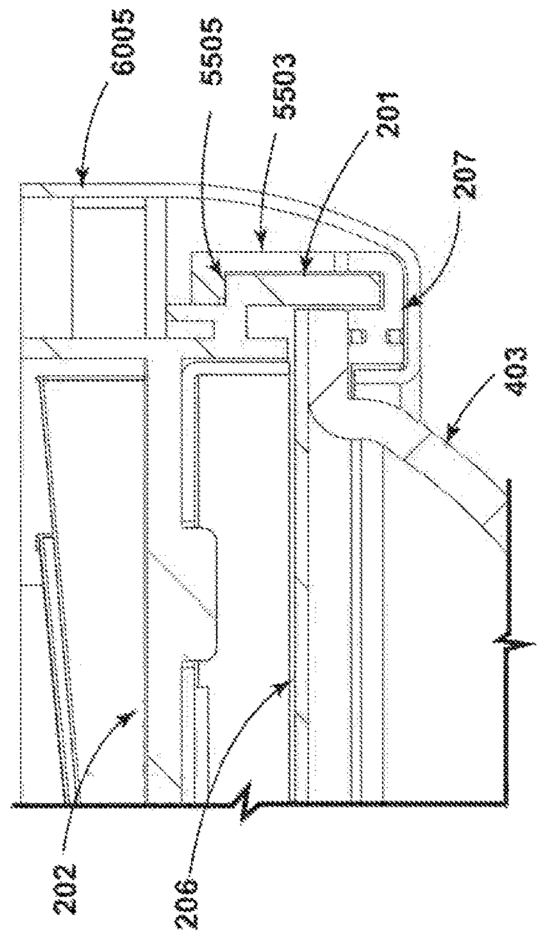
FIG. 24 is a partial cross-sectional view of a modular luminaire assembly, according to various examples.
Figure 25:
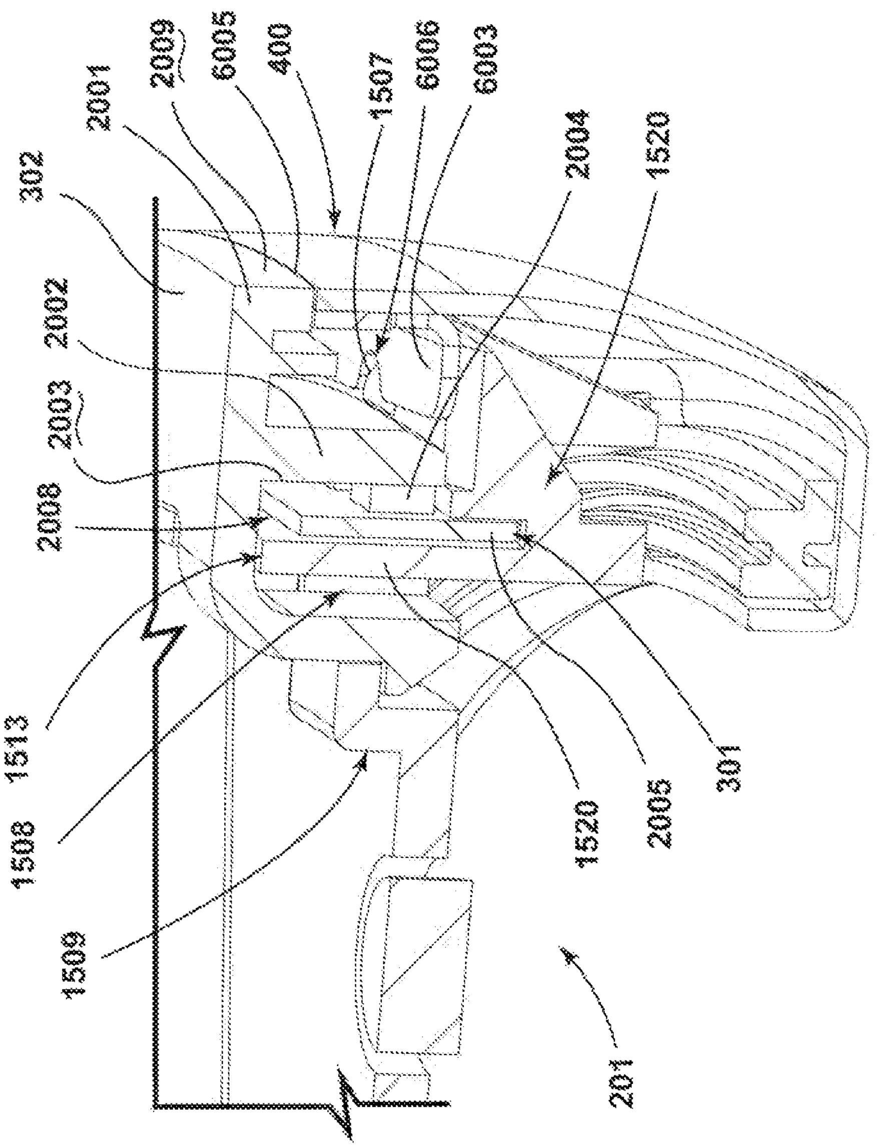
FIG. 25 is a perspective cross-sectional view of the modular luminaire assembly of FIG. 24.

As shown in FIG. 24, when the retaining ring 207 is coupled with the inner housing 201, the snap flanges 5503 of the retaining ring 207 engage the inner housing 201 by interference fit upon a circumferential shoulder 5505 of the inner housing 201. The bezel assembly 400 may then be coupled with the inner housing 201 to extend over the retaining ring 207. As shown in FIG. 25, the plurality of voids 5502 which create a clear means to raise the décor bezel mounting tab 6003 to engage with a respective protrusion 1507 of the inner housing 201. During assembly, the décor bezel mounting tab 6003 is indexed to align with both lower insertion opening 1514 and upper insertion opening 1515 of the inner housing 201. The mounting tab 603 is brought into elevation to permit rotation to align the mounting tab 6003 upon the inner housing 201 face frame mounting flange 1516, and register the notch 6006 in mounting tab 6003 with the respective protrusion 1507 on the face frame mounting flange 1516.

Figure 26:
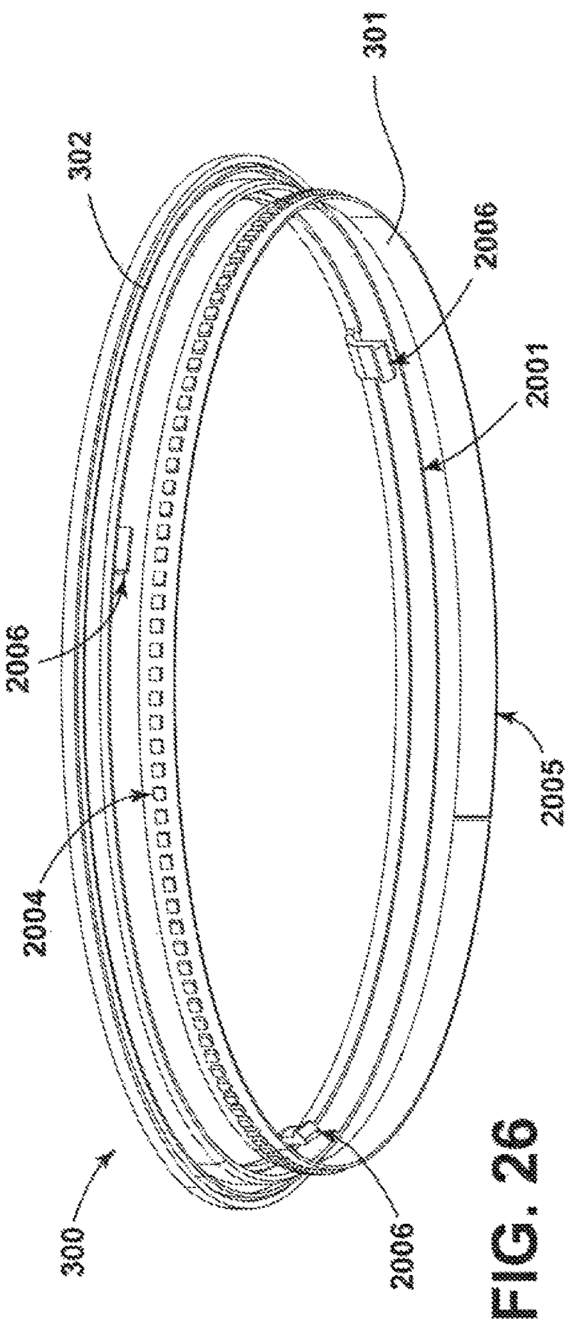
FIG. 26 is a bottom perspective view of a nightlight assembly, according to various examples.

Referring now to FIG. 26, in various examples, the assembly 100 may include a nightlight assembly 300 including a refracting light guide lens 302 and an LED PCBA strip 301. The nightlight assembly 300 is configured to provide a secondary illumination radiation pattern. It will be understood that the assembly 100 may exclude the nightlight assembly 300 without departing from the scope of the present disclosure. As shown in FIG. 25, where a nightlight assembly 300 is included, the outer bezel 402A includes a posterior edge 6005 that abuts and lays tangent to an outer ridge 2001 of the nightlight lens 302, which allows for illumination while covering the internal assembly of parts.

Figure 27:
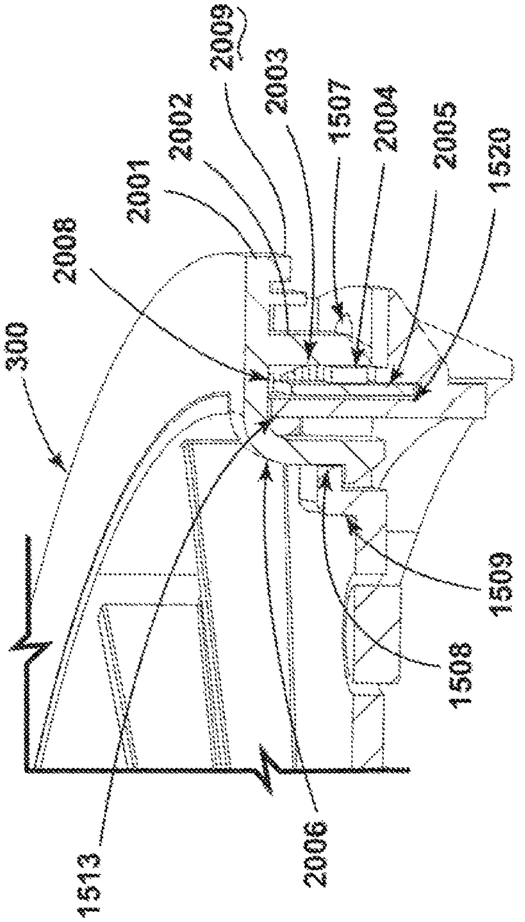
FIG. 27 is a partial cross-sectional view of the nightlight assembly of FIG. 26 coupled with the inner housing of FIG. 5.
Figure 28:
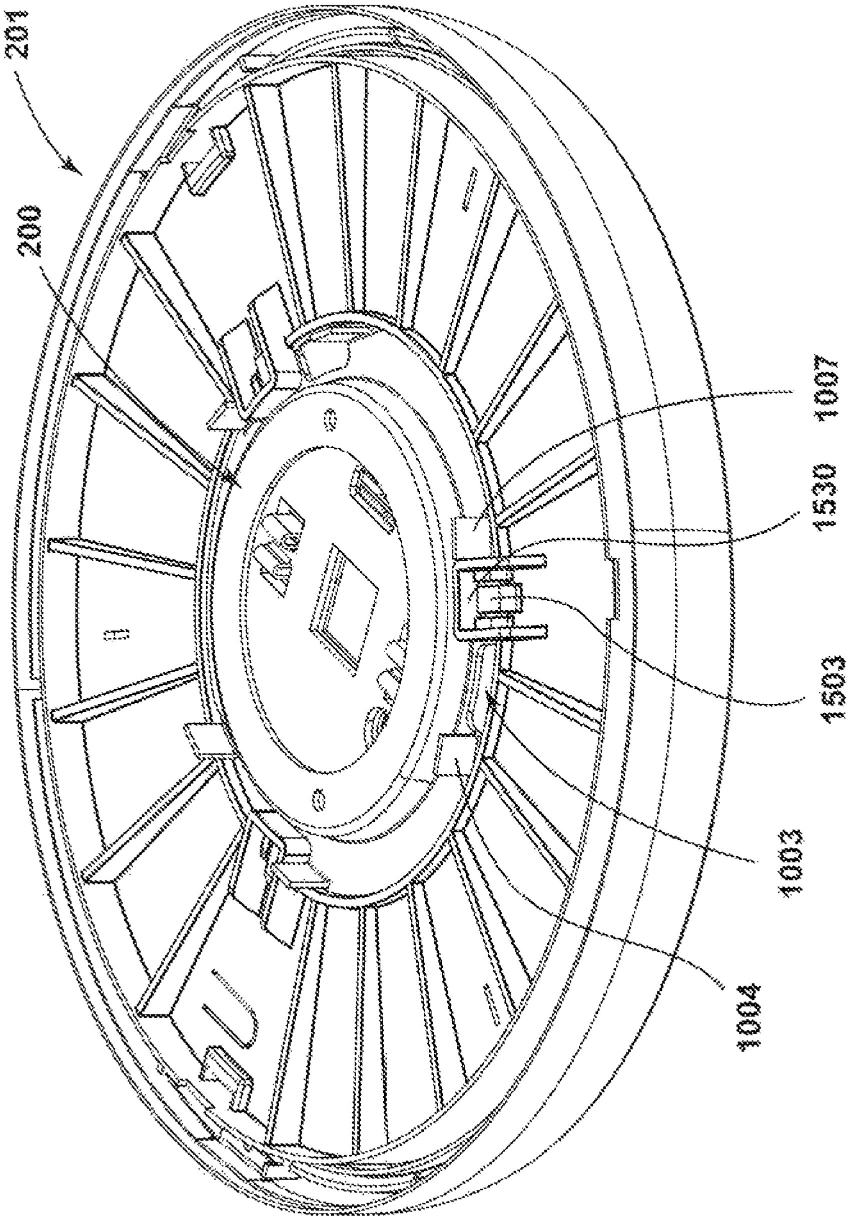
FIG. 28 is a top perspective view of a modular luminaire assembly, according to various examples.
Figure 29:
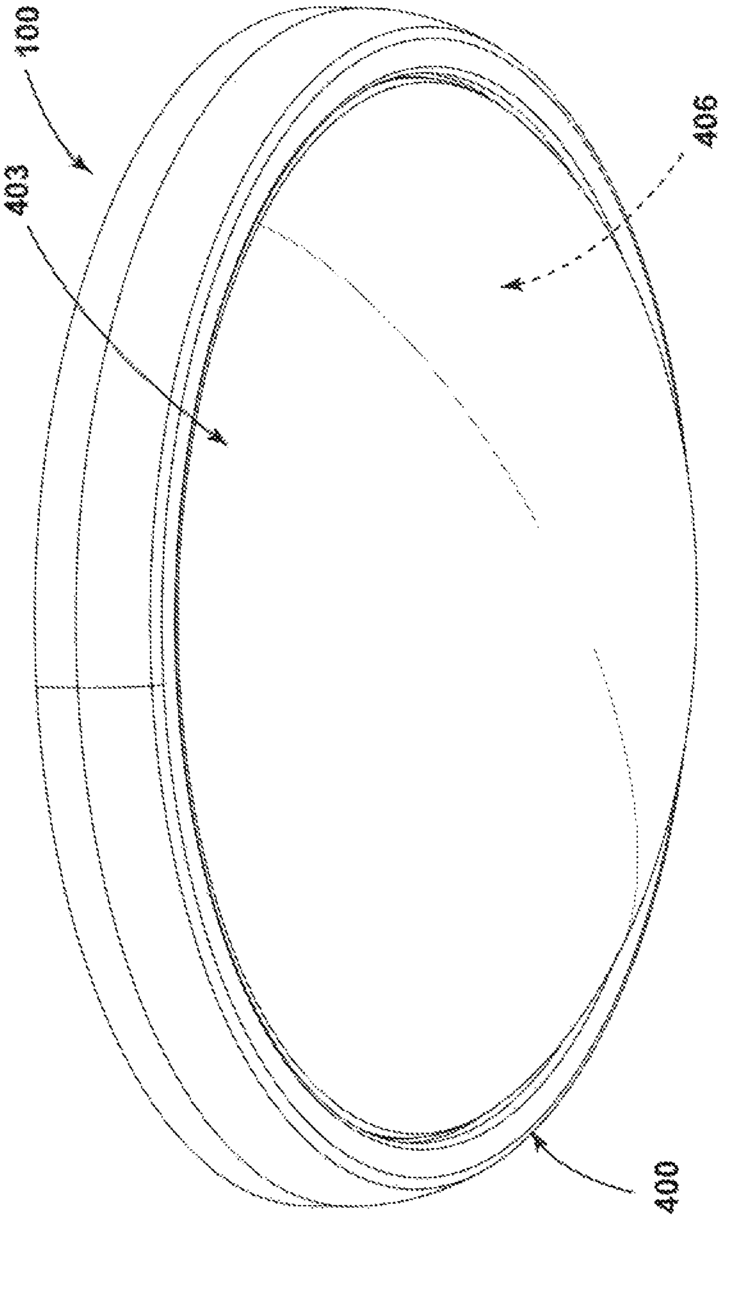
FIG. 29 is a bottom perspective view of the modular luminaire assembly of FIG. 28.
Figure 30:
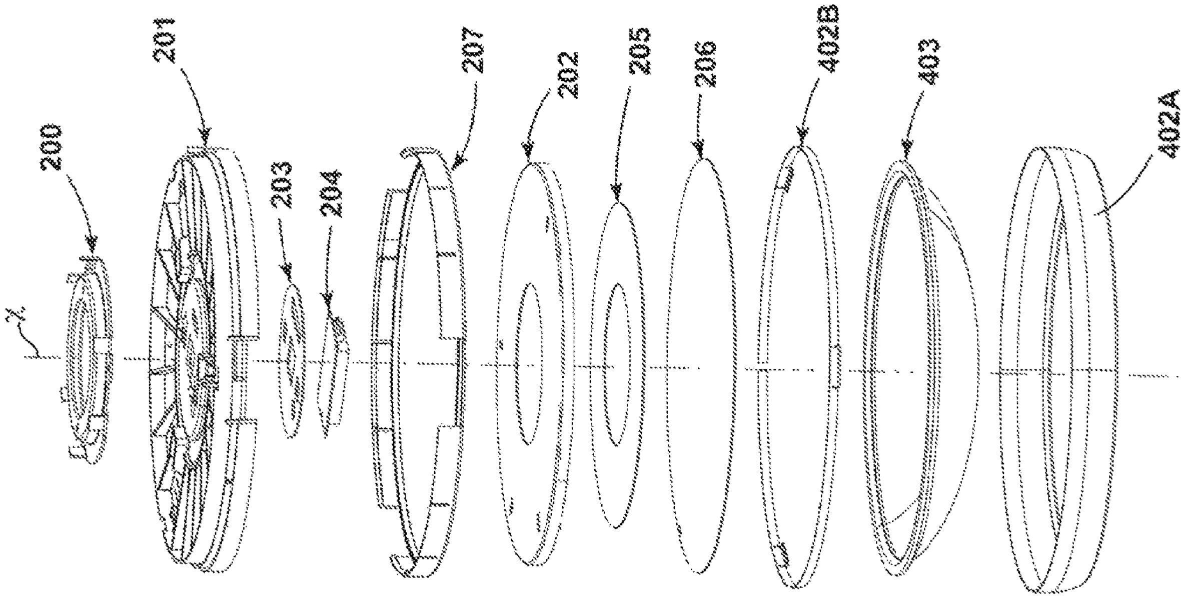
FIG. 30 is an exploded view of the modular luminaire assembly of FIG. 28.
Figure 31:
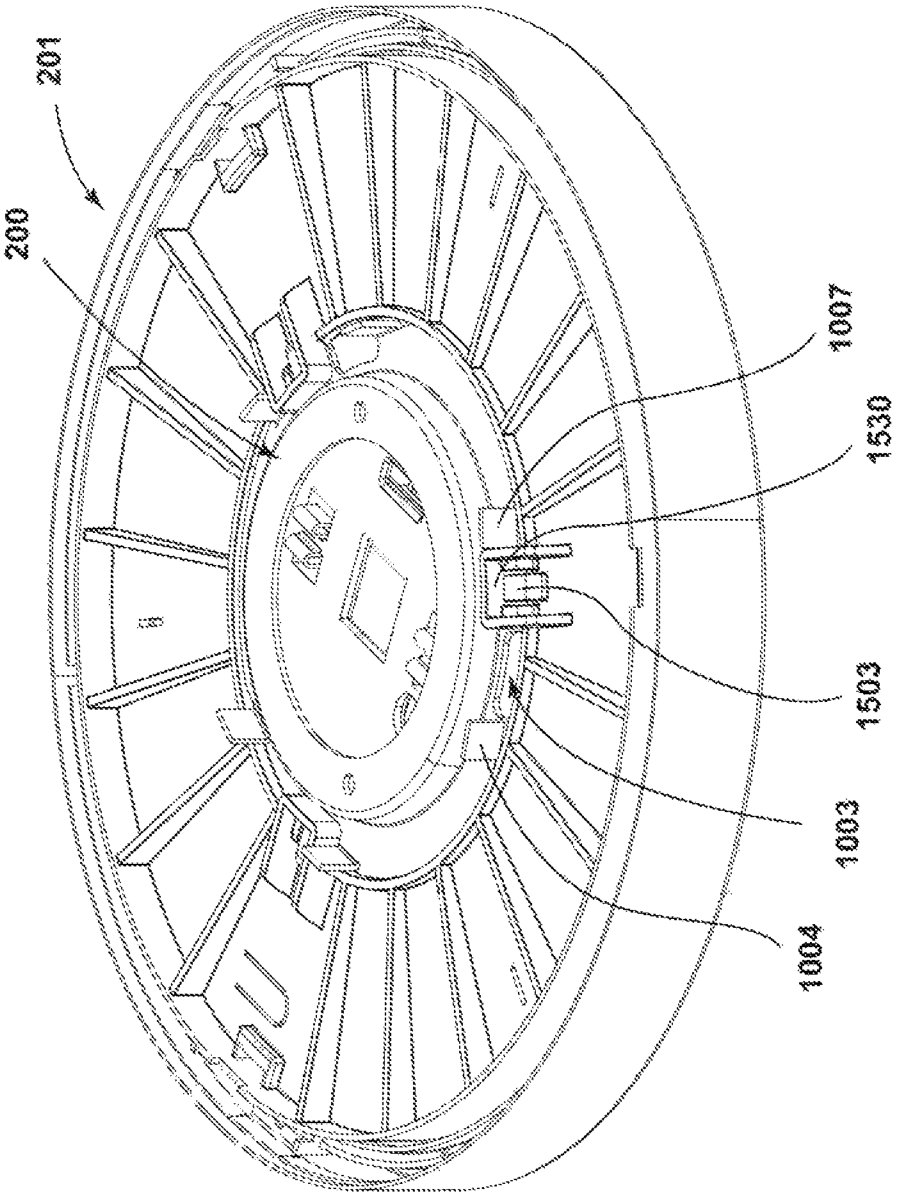
FIG. 31 is a top perspective view of a modular luminaire assembly, according to various examples.
Figure 32:
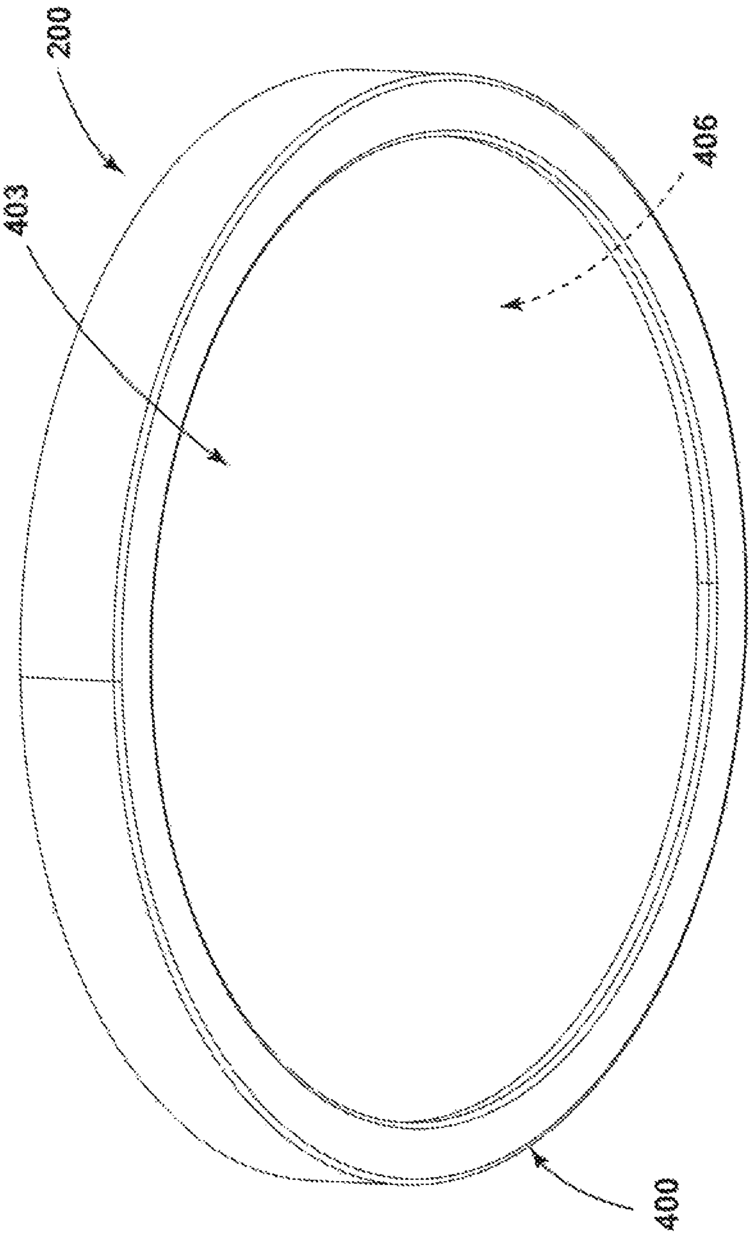
FIG. 32 is a bottom perspective view of the modular luminaire assembly of FIG. 31.
Figure 33:
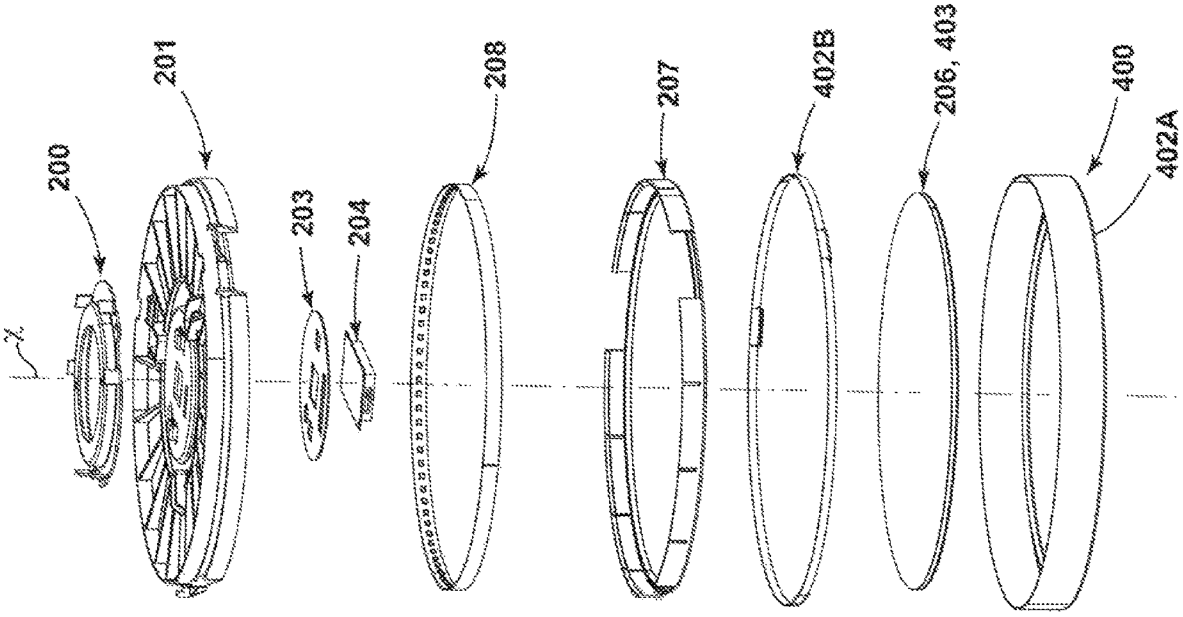
FIG. 33 is an exploded view of the modular luminaire assembly of FIG. 31.
Figure 34:
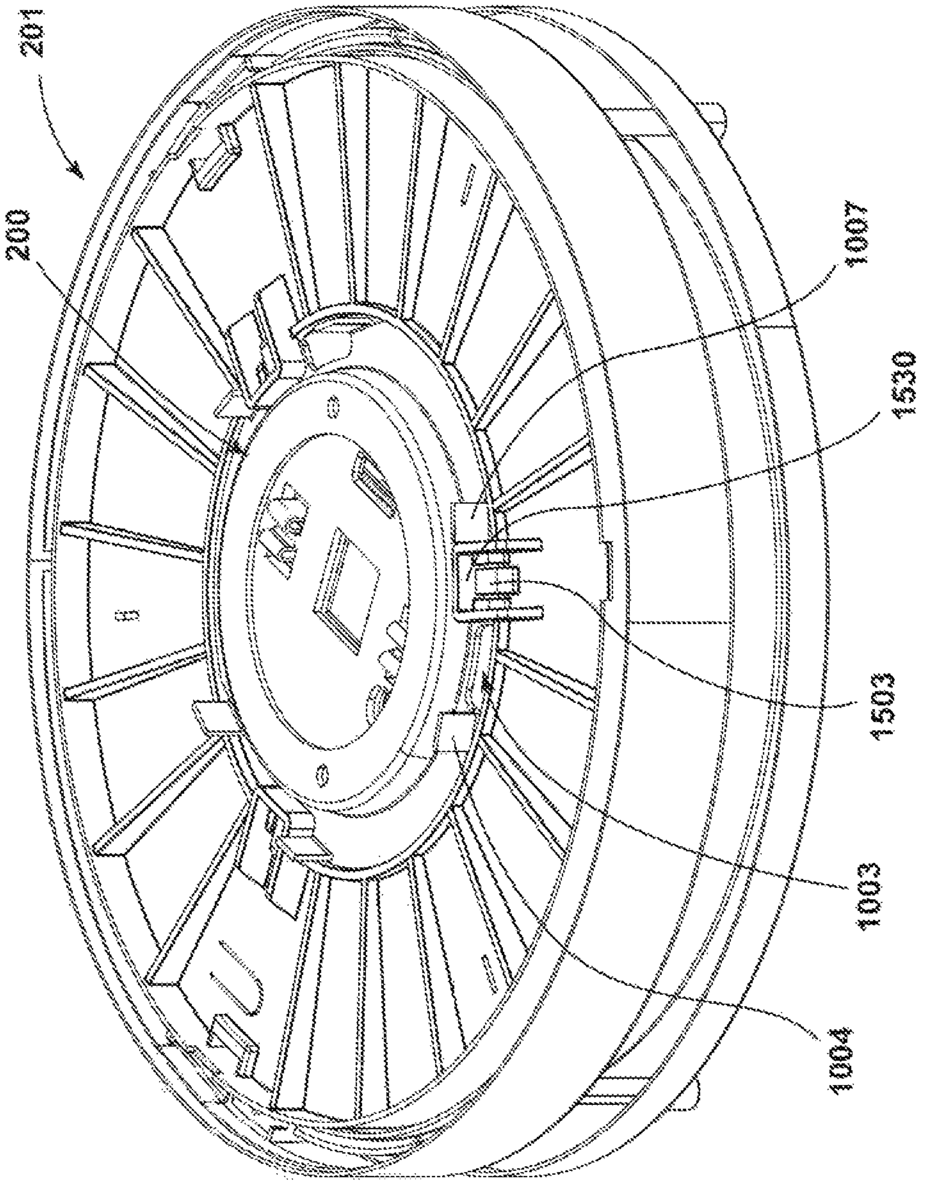
FIG. 34 is a top perspective view of a modular luminaire assembly, according to various examples.
Figure 35:
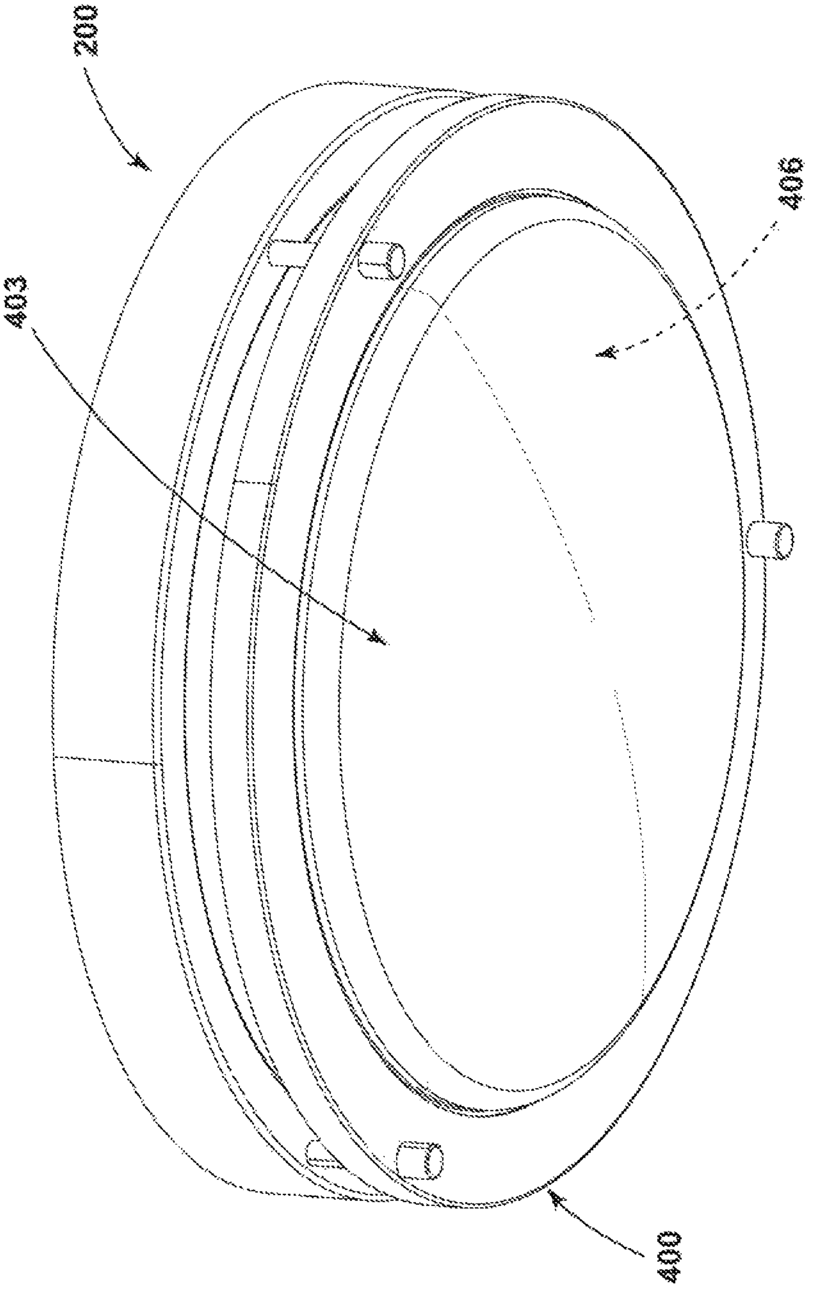
FIG. 35 is a bottom perspective view of the modular luminaire assembly of FIG. 34.
Figure 36:
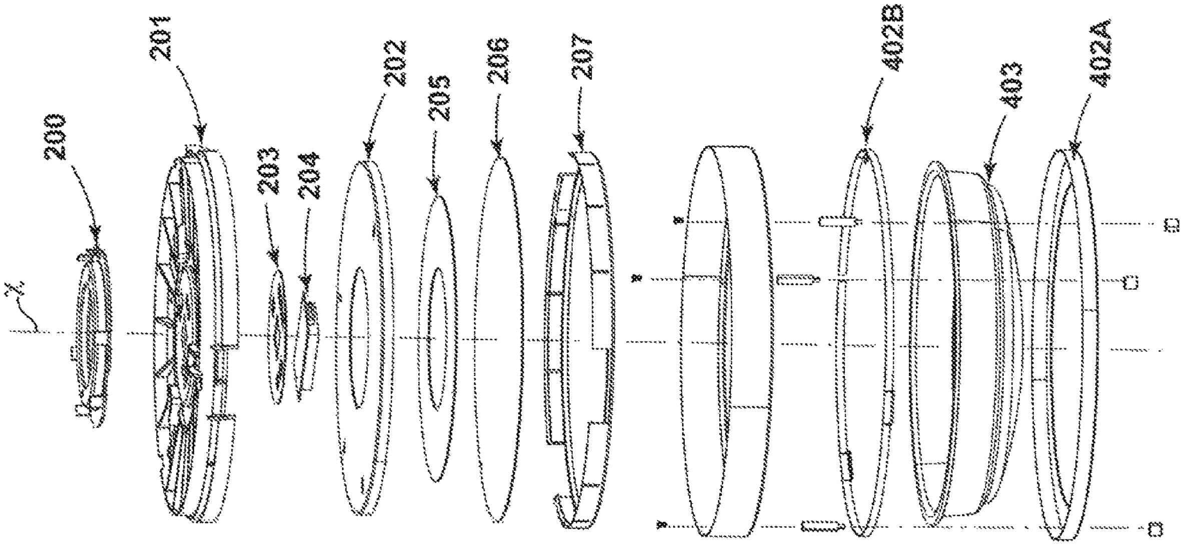
FIG. 36 is an exploded view of the modular luminaire assembly of FIG. 34.

The refracting light guide lens 302 is nominally a circular component, having at least an outer ridge 2001 and an inner ridge 2002, positioned along an anterior side of the lens 302. As shown in FIG. 27, the inner ridge 2002 includes a surface 2003 oriented substantially parallel to the outer perimeter wall 1520 of the inner housing 201. The surface 6003 is spaced apart from the outer perimeter wall 1520 to define a channel 2008 configured to receive the LED PCBA strip 301. This ridge 2002 is configured to provide refraction to allow photons to be transmitted through the refracting light guide lens 302 and exiting through an outer surface 2009 of the outer ridge 2001.

The LED PCBA strip includes a plurality of LED lighting assembly 2004 arranged on an LED PCBA 2005. When assembled, the surface 2003 may be substantially parallel with and/or in contact with the LED lighting assemblies 2004 of the LED PCBA 2005. The refracting light guide lens 302 may include a plurality of bayonet style mounting barbs 2006 positioned circumferentially along the length of the lens 302. The barbs 2006 are arranged to align with voids 1513 in the inner housing 201. When assembled, each barb 2006 is configured to be at least partially received by the respective void 1508. A tooth 2007 of each bayonet barb 2006 is configured to engage with the lip 1550 of the wall 1509.

Referring now to FIGS. 28-36, various exemplary shapes for the various components are shown. The same or similar numbers are used throughout to indicate the corresponding parts for each exemplary shape.

What is claimed is:

1. A modular luminaire assembly comprising:

a mounting ring configured to be selectively coupled with a mounting surface;

an inner housing defining a channel configured to receive the mounting ring, wherein the mounting ring is configured to be selectively coupled with the inner housing;

a lighting assembly;

one or more diffusers configured to direct light from the lighting assembly;

a retaining ring including a ring body defining an opening and a plurality of flanges configured to snap engage with the inner housing, wherein the ring body is configured to at least partially support the one or more diffusers and the lighting assembly; and a thermal pan having a perimeter flange and a pan body defining a plurality of openings, each opening at least partially defined by a linear edge, wherein the inner housing includes a plurality of mating cleats configured to be received by the plurality of openings, and further wherein each mating cleat configured to be received by a respective opening and engage with the respective linear edge to couple the thermal pan with the inner housing.

2. The modular luminaire assembly of claim 1, wherein the one or more diffusers includes an interior diffuser spaced apart from the pan body of the thermal pan to define a mixing chamber.

3. The modular luminaire assembly of claim 1, wherein the lighting assembly includes a planar LED PCBA.

4. The modular luminaire assembly of claim 1, further comprising:

a diffuser configured as a lens; and a light guide plate having an edge configured to receive light from the lighting assembly and redirect the light outward from the light guide plate, wherein the diffuser and the light guide plate are at least partially supported by the retaining ring.

5. The modular luminaire of claim 1, wherein the inner housing includes an outer perimeter wall, an inner perimeter wall, and a central plateau having an edge, and further wherein the outer perimeter wall, the inner perimeter wall, and the central plateau are configured to guide coupling of the mounting ring, the lighting assembly, the one or more diffusers, and the retaining ring.

6. The modular luminaire assembly of claim 1, wherein the inner housing includes an extension surrounding a locking tab and defining a receiving slot, and further wherein the mounting ring includes a locking protrusion configured to be received by the receiving slot by rotation of the mounting ring within the mounting channel in a single axis radially.

7. The modular luminaire assembly of claim 1, further comprising:

a bezel assembly positioned exterior of the inner housing and including an inner ring having a plurality of mounting tabs configured to be rotated radially about a single axis to engage the inner housing.

8. The modular luminaire assembly of claim 1, further comprising:

a nightlight assembly including a lens configured to snap engage with the inner housing to define a channel and a plurality of LEDs positioned within the channel, wherein the lens is configured to direct light from the plurality of LEDs outward from the inner housing.

9. The modular luminaire assembly of claim 1, wherein the one or more diffusers includes an outer diffuser, said outer diffuser defining a cavity configured to house the lighting assembly.

10. The modular luminaire assembly of claim 1, further comprising:

a bezel assembly positioned exterior of the inner housing and including an inner ring having a plurality of mounting tabs configured to be rotated radially about a single axis to engage the inner housing.

11. The modular luminaire assembly of claim 4, wherein the lighting assembly includes an LED PCBA strip.

12. A modular luminaire assembly comprising:

a mounting ring;

an inner housing including a plurality of tabs and notches configured to be rotationally engaged with the mounting ring and further including a plurality of protrusions;

a bezel assembly positioned exterior of the inner housing and including an inner ring having a plurality of mounting tabs each defining a notch, wherein the bezel assembly is configured to be rotated radially about a single axis to engage each of the plurality of protrusions with the respective notch;

a lighting assembly coupled with the inner housing; and at least one diffuser position to direct light from the lighting assembly.

13. The modular luminaire assembly of claim 12, wherein the inner housing includes an outer perimeter wall configured to support the lighting assembly along either an interior plane of the outer perimeter wall or an exterior plane of the outer perimeter wall.

14. The modular luminaire assembly of claim 12, wherein the lighting assembly is configured to be controlled by a first trace control channel.

15. The modular luminaire assembly of claim 12, further comprising:

a nightlight assembly including a lens configured to snap engage with the inner housing to define a channel and a plurality of LEDs positioned within the channel, wherein the lens is configured to direct light from the plurality of LEDs outward from the inner housing.

16. The modular luminaire assembly of claim 15, wherein the plurality of LEDs of the nightlight assembly illumination are configured to be controlled using a second trace control channel.

17. A modular luminaire assembly comprising:

a mounting ring configured to be selectively coupled with a mounting surface and including a locking protrusion;

an inner housing defining a channel configured to receive the mounting ring and including an extension surrounding a locking tab and defining a receiving slot, wherein the mounting ring is configured to be selectively coupled with the inner housing, and further wherein the locking protrusion configured to be received by the receiving slot by rotation of the mounting ring within the mounting channel in a single axis radially;

a lighting assembly;

one or more diffusers configured to direct light from the lighting assembly;

a retaining ring including a ring body defining an opening and a plurality of flanges configured to snap engage with the inner housing, wherein the ring body is configured to at least partially support the one or more diffusers and the lighting assembly.

18. The modular luminaire assembly of claim 17, further comprising:

a nightlight assembly including a lens configured to snap engage with the inner housing to define a channel and a plurality of LEDs positioned within the channel, wherein the lens is configured to direct light from the plurality of LEDs outward from the inner housing.

19. The modular luminaire assembly of claim 17, further comprising:

a thermal pan having a perimeter flange and a pan body defining a plurality of openings, each opening at least partially defined by a linear edge, wherein the inner housing includes a plurality of mating cleats configured to be received by the plurality of openings, and further wherein each mating cleat configured to be received by a respective opening and engage with the respective linear edge to couple the thermal pan with the inner housing.

20. The modular luminaire assembly of claim 17, wherein the one or more diffusers contains one of:

an outer diffuser defining a cavity configured to house the lighting assembly, and an interior diffuser spaced apart from a thermal pan to define a mixing chamber.

* * * * *